US008213856B2

(12) United States Patent
McGinley et al.

(10) Patent No.: US 8,213,856 B2
(45) Date of Patent: Jul. 3, 2012

(54) UNIFIED WEB-BASED SYSTEM FOR THE DELIVERY, SCORING, AND REPORTING OF ON-LINE AND PAPER-BASED ASSESSMENTS

(75) Inventors: Michael P. McGinley, Langhorne, PA (US); Brian C. Maguire, New Hope, PA (US); Scott M. Elliott, New Hope, PA (US); Robert Patrylak, Philadelphia, PA (US); George T. Allen, III, Souderton, PA (US)

(73) Assignee: Vantage Technologies Knowledge Assessment, L.L.C., Newtown, PA (US)

( * ) Notice: Subject to any disclaimer, the term of this patent is extended or adjusted under 35 U.S.C. 154(b) by 341 days.

(21) Appl. No.: 12/181,104

(22) Filed: Jul. 28, 2008

(65) Prior Publication Data

US 2009/0186327 A1 Jul. 23, 2009

Related U.S. Application Data

(63) Continuation of application No. 10/884,404, filed on Jul. 2, 2004, now abandoned.

(51) Int. Cl.
*G09B 7/00* (2006.01)
(52) U.S. Cl. .................. 434/353; 434/350; 434/363
(58) Field of Classification Search .................. 434/322, 434/350, 353, 358, 363
See application file for complete search history.

(56) References Cited

U.S. PATENT DOCUMENTS

| | | | |
|---|---|---|---|
| 4,978,305 A | 12/1990 | Kraft | |
| 5,170,362 A | 12/1992 | Greenberg et al. | |
| 5,437,554 A | 8/1995 | Clark et al. | |
| 5,558,521 A | 9/1996 | Clark et al. | |
| 5,565,316 A | 10/1996 | Kershaw et al. | |
| 5,664,115 A | 9/1997 | Fraser | |
| 5,672,060 A | 9/1997 | Poor | |
| 5,706,502 A | 1/1998 | Foley et al. | |
| 5,709,551 A | 1/1998 | Clark et al. | |
| 5,716,213 A | 2/1998 | Clark et al. | |
| 5,735,694 A | 4/1998 | Clark et al. | |
| 5,827,070 A | 10/1998 | Kershaw et al. | |
| 5,862,223 A | 1/1999 | Walker et al. | |
| 5,907,831 A | 5/1999 | Lotvin et al. | |
| 5,930,777 A | 7/1999 | Barber | |
| 5,947,747 A | 9/1999 | Walker et al. | |

(Continued)

*Primary Examiner* — Kang Hu
(74) *Attorney, Agent, or Firm* — Condo Roccia LLP

(57) ABSTRACT

A hardware and software implemented, standardize testing, scoring and reporting system has a network interface, being either LAN or the Internet. A test is selected from a library, assigned to a group of examinees, and a record is made of the assignment. The test is available on-line, or downloaded, or both. Downloaded tests are saved as PDF files and printed into booklets. Examinees record answers on bubble sheets, which are scanned at the customer site or shipped to a processing plant. Individual scanned answer sheets provided data for individual scanned records. Scanning software performs an initial auto-correct and then performs an initial check for errors in scanned records. Tests are batched for later inspection. Scanned records with errors are classified as invalid and the test papers are separated. Prompts are generated for a human test paper inspection and scanned record editing. Accepted batches of scanned records are sent to a scanned records server where a second scanned records error check is performed. Prompts are sent to the appropriate scanning station for further human editing of invalid scanned records. Once all records are valid they are scored and the test results stored in a database, which is accessed by a reporting subsystem associated with an on-line server.

20 Claims, 22 Drawing Sheets

U.S. PATENT DOCUMENTS

| | | | |
|---|---|---|---|
| 5,974,446 | A | 10/1999 | Sonnenreich et al. |
| 5,987,149 | A | 11/1999 | Poor |
| 5,987,302 | A | 11/1999 | Driscoll et al. |
| 5,991,595 | A | 11/1999 | Romano et al. |
| 6,009,412 | A | 12/1999 | Storey |
| 6,042,384 | A | 3/2000 | Loiacono |
| 6,112,049 | A | 8/2000 | Sonnenfeld |
| 6,120,299 | A | 9/2000 | Trenholm et al. |
| 6,157,926 | A | 12/2000 | Appleman et al. |
| 6,173,154 | B1 | 1/2001 | Kucinski et al. |
| 6,183,260 | B1 | 2/2001 | Clark et al. |
| 6,183,261 | B1 | 2/2001 | Clark et al. |
| 6,234,806 | B1 | 5/2001 | Trenholm et al. |
| 6,256,399 | B1 | 7/2001 | Poor |
| 6,295,439 | B1 | 9/2001 | Bejar et al. |
| 6,311,040 | B1 | 10/2001 | Kucinski et al. |
| 6,338,105 | B1 * | 1/2002 | Niizuma et al. ................ 710/72 |
| 6,466,683 | B1 | 10/2002 | Poor |
| 6,513,042 | B1 | 1/2003 | Anderson et al. |
| 6,526,258 | B2 | 2/2003 | Bejar et al. |
| 6,558,166 | B1 | 5/2003 | Clark et al. |
| 6,577,846 | B2 | 6/2003 | Poor |
| 6,684,052 | B2 | 1/2004 | Kucinski et al. |
| 6,810,232 | B2 | 10/2004 | Knowles et al. |
| 7,149,468 | B2 | 12/2006 | Patz et al. |
| 2002/0123029 | A1 | 9/2002 | Knowles |
| 2004/0086841 | A1 | 5/2004 | Clark et al. |
| 2004/0202992 | A1 | 10/2004 | Moulthrop et al. |

* cited by examiner

System for Scanning and Editing Test Responses

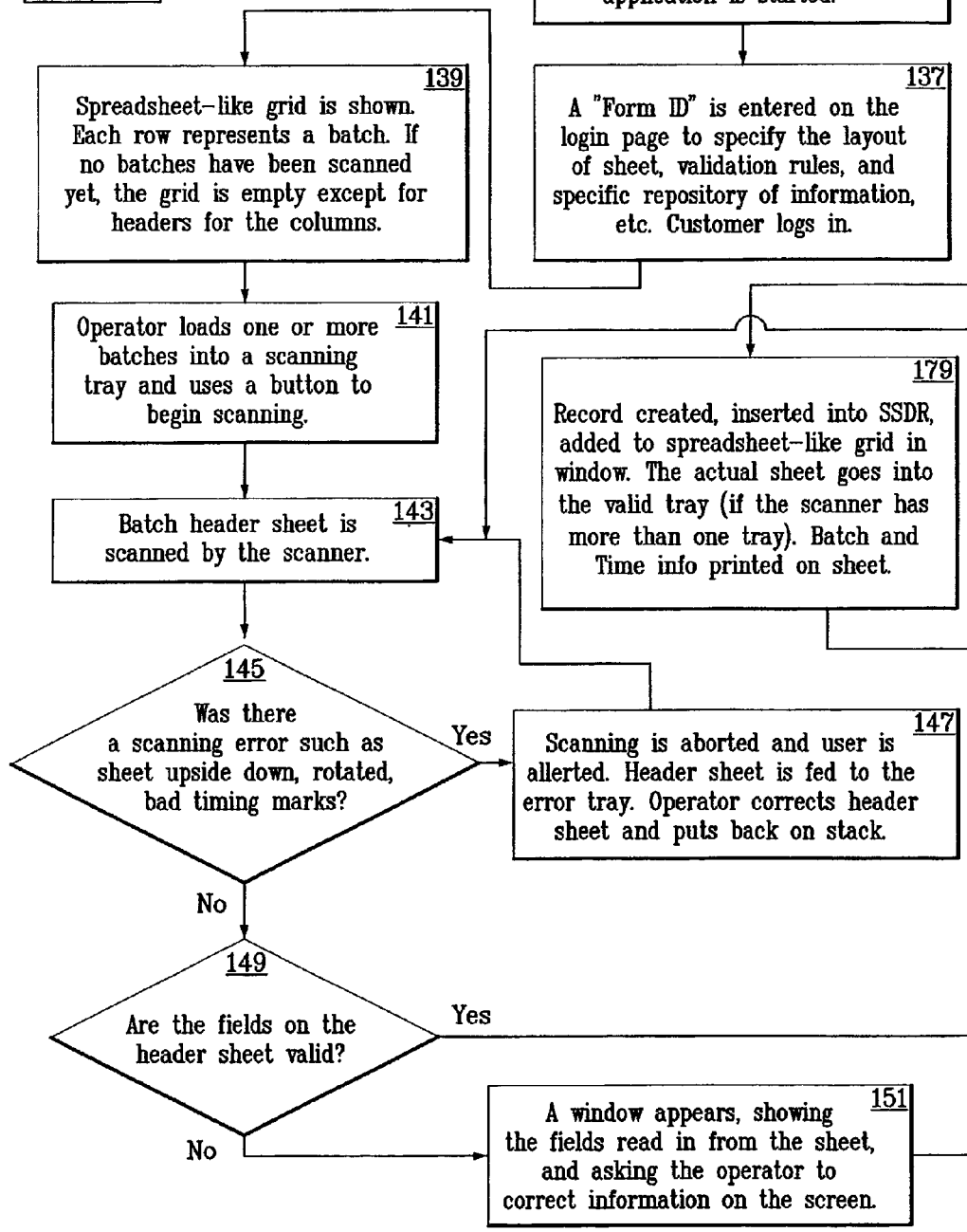

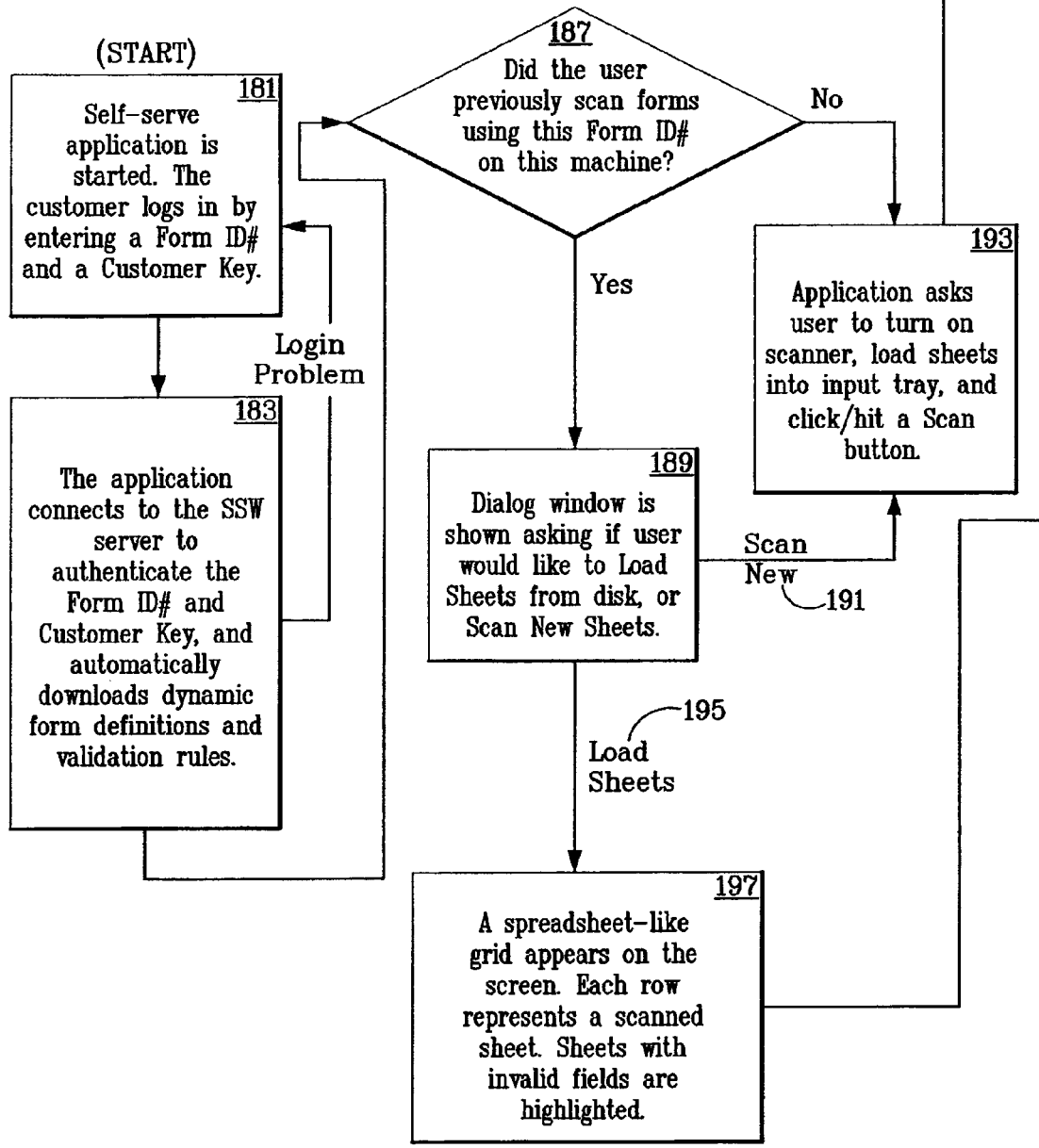

FIG. 11

| Fig. 11A | Fig. 11B |
|---|---|

FIG. 11A

Standard Method of Editing for Assembly Line Process (BEGIN)

SELECT PHYSICAL BATCH STACK — 221
Editor takes hold of a physical stack of bubble sheets or papers that came out of a scanner as invalid (in the invalid tray, or printed with an invalid stamp.) Sheets are typically already grouped by batch, usually with a physical divider (such as a header sheet or envelope) separating one batch from another.

↓

START — 223
Application is started. Editor logs in by entering Form ID# and Customer Pass Code (Key).

↓

APPLICATION SHOWS LIST OF BATCHES — 225
A spreadsheet-like grid is displayed on the screen, showing all of the batches that were scanned using that Form ID# and Customer Pass Code. Each batch is a row, and batches with errors are highlighted. The grid is sortable by school, by date, etc.

↓

LOCATE BATCH ROW — 227
Editor takes the first/next batch of sheets from the top of his/her physical stack, and locates the row in the grid corresponding to that batch.

↓

SELECT BATCH ROW — 229
Editor double clicks on the batch row, and a new window opens showing a spreadsheet-like grid of the sheets that were scanned in association with that batch.

↓

FIND SHEET ROW — 231
Editor looks through rows on the screen highlighted in red that represent the invalid sheets. Editor matches rows on screen to paper sheets, one at a time.

*FIG. 12*

Welcome to the • • • • • • • • System.

To begin testing, please enter your (1) Username, (2) Password, and then click on the "Sign In" button.

Username : [      ]
Password : [      ]

Forgot your password?     [Sign In]

FIG. 13

Activity Menu
Please select an option below to continue.

| Student Groups and Assignments |

| Create Assessment |

| Portfolios and Reports |

| Offline Testing |

| Run : Diagnostic Test |

| Search and Manage Users |

| Update Account |

FIG. 14

Student Portfolio/Reports Menu
Please select an option below to continue.

| Student Portfolios |

| Roster and Item Analysis |

| Classrom and Roster Analysis |

| State Reports |

Select a Test

Browse available assessments by clicking on a category – Diagnostic Assessments, Campus Assessments, or Your Assessments. All test within that category will be listed on the screen. To make an assignment, click on the name of the assessment.

> Assessments >    Diagnostic Assessments

- 4th Grade
- 5th Grade
- 6th Grade
- 7th Grade
- 8th Grade

- 4th Grade Test Form D
- 4th Grade Test Form E
- 4th Grade Test Form F
- 4th Grade Test Form G
- 4th Grade Test Form H
- 4th Grade Test Form I
- 4th Grade Test Form J
- 5th Grade Test Form D
- 5th Grade Test Form D (deleted)
- 5th Grade Test Form E
- 5th Grade Test Form F
- 5th Grade Test Form G
- 5th Grade Test Form H
- 5th Grade Test Form I
- 5th Grade Test Form J
- 6th Grade Test Form D
- 6th Grade Test Form E
- 6th Grade Test Form F
- 6th Grade Test Form G
- 6th Grade Test Form H
- 6th Grade Test Form I
- 6th Grade Test Form J
- 7th Grade Test Form D
- 7th Grade Test Form E
- 7th Grade Test Form E
- 7th Grade Test Form F
- 7th Grade Test Form G
- 7th Grade Test Form H
- 7th Grade Test Form I
- 7th Grade Test Form J
- 8th Grade Test Form D
- 8th Grade Test Form E
- 8th Grade Test Form E
- 8th Grade Test Form F
- 8th Grade Test Form F
- 8th Grade Test Form G
- 8th Grade Test Form H
- 8th Grade Test Form I
- 8th Grade Test Form J

[Back]  [Cancel]

Scanning Wizard

| Step 1: Select a Form | Step 2: Load and Scan | Step 3: Scanning Sheets | Final: Transfer Result |

Enter your Scanner Form ID, and Customer ID Number and Click "Next".

Scanner Form ID: *1848

Customer ID: 999999

[Help]   [Next >]

VANTAGE LEARNING

FIG. 17

| | Status | First | M | Last | DOB | Gr | Room | Test | Gr | SpC | Se | Se | ItemsM | ItemsL |
|---|---|---|---|---|---|---|---|---|---|---|---|---|---|---|
| 1 | INVALID | VIRGINIA | • | • • • | 032989 | 9 | | 0907 | F | | C | | CBCDBADACACBDACAA | B |
| 2 | SCANNED | BRANDON | • | • • • | 060889 | 9 | 0023 | 0909 | M | | C | | BACCBCADACDCDACC | |
| 3 | SCANNED | VERONICA | • | • • • | 041889 | 9 | 0023 | 0909 | F | | C | | ACDBCCAACBCD | |
| 4 | SCANNED | TONY | • | • • • | 042489 | 9 | 0023 | 0909 | M | | C | | BCACBDCAADBCCDBC | |
| 5 | INVALID | MALIK | • | • • • | 031488 | 9 | 23 | | M | | C | | BDCCBCDDACBCBCAB | |
| 6 | SCANNED | KEIN | • | • • • | 041289 | 9 | | 0909 | M | | C | | CACCBCACACDDBCBA | |
| 7 | INVALID | SHARNAY | • | • • • | 081189 | 9 | 21 | | F | | C | | BABBCDBCBCCBABC | |
| 8 | SCANNED | TIMOTHY | • | • • • | 111988 | 9 | | 0909 | M | | C | | DADBBCAACCBCDBBC | |
| 9 | INVALID | MICHAEL | • | • • • | 070689 | 9 | 23 | | M | | C | | BDCDBCCBCCBCDDCC | |
| 10 | INVALID | SHAUDAI | • | • • • | 091188 | 9 | 23 | | F | | C | | BCCBDBCDACBCCCAD | |
| 11 | SUSPICIOUS | CHRIS_OPHE | • | • • • | 010195 | 9 | 23 | 0909 | M | | C | | BCDDBCAAACBCBCDB | |
| 12 | INVALID | ASHLEY | • | • • • | 100888 | 9 | 23 | | F | | A | | AACDBBABAABBDACB | |
| 13 | INVALID | JEFFERY | • | • • • | 061689 | 9 | 23 | | M | | C | | BBCBCCCBCCBCBDBB | |
| 14 | INVALID | EVERETT | • | • • • | 010489 | 9 | 23 | | M | | C | | BCCBDBCCAABCCBCBB | |
| 15 | SCANNED | DONTE | • | • • • | 072989 | 9 | 493 | 0909 | M | | | | CABDADBACDBABDB | |

FIG. 18

The list below shows each of the scanned test form records. All successfully scanned records should show a SCANNED status. Click on INVALID RECORDS (if there are any) to see the errors and instructions for fixing. Then, click Submit Forms to Server. At any time, you may use the RESCAN/SCAN NEW FORMS button to scan additional forms, or rescan corrected forms.

4 Scanned Forms

| Seq | Status | Student I.D. | Last | First | MI | G | Gr | DOB | Class | Room | ItemsR | ItemsM |
|---|---|---|---|---|---|---|---|---|---|---|---|---|
| 1 | USER NOT FOUND | 088588510 | JOHNS | JANICE | R | F | 12 | 080474 | | 064 | ABAA CABAA | ACCDAAB CD |
| 2 | ACCEPTED | 088588510 | JOHNS | JOSEPH | R | M | 12 | 080474 | | 064 | ABAA CABAA | ACCDAAB CD |
| 3 | CODE NOT VALID | | BORD | JAN | D | F | 12 | 080474 | | 064 | ABAA CABAA | ACCDAAB CD |
| 4 | ACCEPTED | 077588514 | MCGINLEY | MICHAEL | P | M | 12 | 080474 | | 064 | ABAA CABAA | ACCDAAB CD |

ACCEPTED Record 4: MICHAEL MCGINLEY

The server accepted the scanned form, and the student's responses have been recorded in our database

```
------DATA------
STUDENTID = 077588514
LASTNAME = MCGINLEY
FIRSTNAME = MICHAEL
MI = P
GENDER = M
GRADE = 12
ETHNICCODE = 4
DOB = 080474
SPECIAL CODES = 41
ITEMS0110 = ABAA CABAA
ITEMS1120 = ACCDAAB CD
```

[< BACK]  [CLEAR]  [SUBMIT FORMS TO SERVER]  [RESCAN/SCAN NEW FORMS]

| Seq | Batch ID | Date Completed | SCode | HomeR | Region | School | Teacher | Grades | SC | # | ACC | INV | INT | RDY | SE | M | N | W |
|---|---|---|---|---|---|---|---|---|---|---|---|---|---|---|---|---|---|---|
| 1 | | TOTAL | — | — | — | — | — | — | — | 90 | 0 | 69 | 0 | 0 | 1 | 0 | 0 | |
| 2 | 13183 | 4/29/2004 | 4020 | 2 | HS-West | --- | BA -- | 9 | 16 | 15 | 0 | 11 | 0 | 0 | 0 | 0 | 0 | A |
| 3 | 13182 | 4/29/2004 | 4060 | 23 | HS-Central | --- | BC -- | 9 | 24 | 24 | 0 | 15 | 0 | 0 | 1 | 0 | 0 | A |
| 4 | 13181 | 4/29/2004 | 4020 | 205 | HS-West | --- | RB -- | 9 | 16 | 1 | 0 | 0 | 0 | 0 | 0 | 0 | 0 | A |
| 5 | 13180 | 4/29/2004 | 4020 | 205 | HS-West | --- | RB -- | 9 | 12 | 9 | 0 | 8 | 0 | 0 | 0 | 0 | 0 | A |
| 6 | 13179 | 4/29/2004 | 4020 | 205 | HS-West | --- | RB -- | 9 | 16 | 0 | 0 | 0 | 0 | 0 | 0 | 0 | 0 | A |

UNIFIED WEB-BASED SYSTEM FOR THE DELIVERY, SCORING, AND REPORTING OF ON-LINE AND PAPER-BASED ASSESSMENTS

BACKGROUND OF THE INVENTION

The present invention is directed to a system and a method for selecting, delivering, conducting, editing, scoring, and reporting on standardized achievement tests.

The automation of test scoring is a complex problem that has been of interest for many years. There is considerable pressure to optimize the efficiency, accuracy, speed and the repetitiveness and therefore the reliability of such test scoring, data accumulation and reporting. Of primary interest has been the scoring of multiple choice answer sheets. Of further interest has been the recording and reporting of test results.

Beginning in about the late 1960's, technology has been developed to machine score optically-scanned answer documents. Hardware has improved throughout the years. However, the basic testing approach has remained reasonably constant. Students/examinees respond to multiple choice questions by completely filling in "bubbles" on a machine scannable answer sheets using a pencil or a pen. A "bubble" is a predetermined outlined round, square, or oval location on the answer sheet designated for an answer selection. When the answer sheet is scanned, the hardware (scanner) identifies the dark mark, with either a pencil or pen scanner head, and an answer for each question, and electronically stores the student's responses.

Scanners and computer hardware have become more affordable over the years. Optimal mark reading (OMR) systems are well known in the art, including those used for scanning forms having pencil marks within a preprinted target area, such as circles, squares, or ovals. OMR systems can sense data recorded within the printed areas by detecting light absorption, usually in the near infrared range (NIR). This is NIR scanning. This method permits the differentiation of darkened pencil/pen marks from preprinted material on an answer form, as the preprinted material generally is provided in a pigmented color which does not absorb the NIR light. Such OMR scanners therefore permit the gathering of answer data that can be converted into digital form, scored against an answer data base and have the scores saved in storage associated with the test person's personal identification data. The scanning and the scoring of answers is conducted under the direction of specialized software. In the past, two of the most commonly used software packages were SCANTOOLS, provided by National Computer Systems (Minneapolis, Minn.) and BASIC SCRIPT, provided by Scantron Corp. (Tustin, Calif.).

Testing for the purposes of evaluation of achievement, and for evaluating specific achievement in one or more targeted (special) areas of knowledge has utilized multiple choice testing where answers are recorded on bubble sheets. The automated scoring of bubble sheets and thereafter the statistical and other processing of test results has become the focus of much research and development.

A test is typically divided into sections of questions. The test specification generally defines the number of items to be presented in a test, the number of test sections, the number of questions in each section, the allotted time for responding to all items in each test section, and the time for taking the test.

Under the stress of such conditions, certain "irregularities" can arise on a test answer sheet. Among these are a failure of a student/examinee to enter identification data properly or to leave out identification data, such a full name, school identification, class identification, teacher name, date, and other such data and/or to miss spell any of these. Moreover, with large numbers of rows and columns of "bubbles" for answer selection, a student/examinee may miss-apply an answer, or fill-in more than one choice, or even incompletely fill-in a bubble to the point where the OMR/NIR equipment misses an answer where the student made an insufficient mark where he intended it to be an answer. Or a student may erase an answer and choose another answer whereof the erasure is insufficient to provide a single choice in a multiple choice line. In the mechanized scoring of test sheets, not only is competent scoring desired, but also the full and proper student/examinee identification data is required for the post-grading statistical manipulation and analysis of scores and reporting.

The speedy resolution of these factors becomes more important where standardized tests are used frequently throughout a school year as a feedback tool for both the teacher/administrator and the student in order to provide student achievement assessment. In such instances the scoring and reporting functions must be carried out in a reasonable time period in relationship to the student's continuing lessen plan. Therefore, a rapid test turn around time is desirable.

In the mechanized scoring of standardize tests in the past, non-academic errors (i.e., those other than answering questions) would have rendered the test sheet unreadable and would have either voided the student's performance or required the scoring organization to hand search for the student's test paper and then hand grade the test, or to force the student to retake the exam.

Similar problems usually do not arise with the on-line administration of tests, either though a local area network (LAN) or via the internet. However, this on-line testing requires instructional/testing systems available at workstations for each student or examinee. Some examples of instructional programs which included multiple choice achievement testing have included those available from Computer Curriculum Corp., from Computer Networking Specialists, Inc, from New Century Education, from Unisys-ICOPN System, from Wasatch Education System and from Wicat Systems. Educational Testing Service has also developed a computer-based testing system, comprised of a test document creation system and an administrative system for initiating and terminating the delivery of a computerized test to an examinee. Those systems like the Educational Testing Service system have focused on the prevention of student cheating, which by way of example may be implemented by randomizing the test question order for each workstation.

A latent problem with machine testing is the unavailability of sufficient numbers of workstations so that each student/examinee has a workstation available at the same time. In the educational environment, where a school district administers standardized tests to large numbers of students at the same time, on-line testing becomes reasonably impractical. Where the groups are small, such as governmental and corporate testing, or very specialized small classes, on-line workstation testing is feasible and even desirable.

Several institutions and corporations have developed various methods for administering tests and various methods for the automation of the scoring process and/or the automated administration of the human scoring process in an effort to achieve human standardization. Among these is National Computer Systems, Inc., Eden Prairie, Minn. ("NCS"). NCS has developed a computerized administration system for monitoring the performance of a group of individuals (resolvers) grading open ended (non-multiple choice) portions of the same test. The NCS system scans student tests and then presents the tests to scoring individuals over a LAN system which monitors the work performance of each scorer. The NCS system, in real-time, compares the production, decision making, and work flow of the scoring individuals and then provides feedback and an on-line scoring guides to the individual scorers, as well as adjusts their work volume and work breaks. The NCS system, even while encompassing real-time prompting of its scoring individuals, does not generate fast turn around nor quasi-fast turn around scoring of the students tests. The reason the NCS system operates in delayed-time turn around is because it utilizes humans to examine, to analyze, to make decisions, and then to score each test.

NCS has also developed a computerized distribution system for optically scanned essay answers and storing "batches" of test answers for off-line scoring of batches. A "batch" is a grouping of tests for storage location purposes and identification purposes. The NCS system is also used for training and qualifying human scorers. Real or "live" test answers are distributed to scorer workstations though a LAN system. The production operation of a plurality of human scorers, each scoring an assigned batch of test answers, is managed by monitoring work volume and work flow and allocating work load. Computer security is provided for all data for test scores, and for file access.

Educational Testing Service, Princeton, N.J. ("ETS"), which is well known for generating and scoring academic skills tests (e.g., SATs, LSATs, GMATs etc.), has developed a LAN based workstation system for human evaluators which control the presentation of constructed responses (open-ended essay portions of a test) to minimize the influence of psychometric factors on the accuracy of the human evaluators. The performance of human evaluators to test questions (scoring answers to test questions) is monitored and evaluated against a performance guideline database to assure consistency of performance from each evaluator. Further, ETS has developed a system for on-line essay evaluation. The system manages the work distribution to human evaluators and work flow including the real-time on-line testing period.

Along with this, ETS has developed a computerized test development tool for the monitoring and the evaluation of both its human evaluators and the proposed essay test questions to which the examinees are to be presented in test taking. Responses to proposed questions are constructed by research scientists and are categorized based on descriptive characteristics indicating the subject matter of interest. The constructed answers are presented to the human evaluators working at individual workstations and their score is assembled into a database for later evaluation by the test developers for the appropriateness of the test questions and the ability of the human evaluators to score answers.

In its development of the questions for standardized tests, ETS has also developed development tools, i.e., systems, to assist in developing rebuics for use in computerized machine scoring of essay answers. The user of the development system is usually a test analyst working at a workstation. The test analyst or researcher selects from a list a plurality of questions with answers to be scored. Four scoring modes are provided: interactive, continuous, alarm and sample scoring. In the interactive mode, the researcher checks the machine's performance on an item-by-item basis, where an item is an answer scored. The researcher can accept the score, change one or more feature scores, change the overall item score, or change the rebuics for the item.

In the continuous scoring mode, the computer scores all of the selected items and stores the scores in a database. The continuous mode is used after the researcher is satisfied from the interactive mode that the scoring rebuics are correct for all items (all answers) scored. In the alarm mode, the computer alarms an irregular condition wherein the researcher may perform any of the activities of the interactive mode, i.e., accept the score, change one or more feature scores, change the overall item score, or change the scoring rebuics.

In order to avoid examinee identification errors, ETS has developed a bar code to be assigned to each examinee for each test. The bar code label appears on the face of the bubble sheet.

ETS has also developed a system for producing a computerized test, delivering it to an examinee at a workstation and recording examinee responses to questions presented during the delivery of the test. The system provides for operator input to create a digital record of each question for a test and then assembling a test package into a predetermined examinee screen presentation. This ETS system cannot be interfaced with the internet to operate in another mode of testing. An administration portion of the system controls the initiating and terminating of the delivery of the test (the time for the test) to the examinee workstation. Interactive software responds to examinee key prompts to present, or represent, examinee desired portions (pages or specific questions) of the test on the examinee's screen. Examinee's responses to questions are stored locally at the workstation. The examinee performance is evaluated after the testing period ends. A data portion holds examinee performance files, security log files, error log files which have been generated by the ETS system. A report is generated from the data retrieved from the data portion to generate a report including any of the following system administrative information: activity, audit trail, daily processing control, exception, security/event log, and essay. Test score data is stored against the examinee log-on data and is reportable for each examinee. The system also automatically checks for viruses.

Other developers in this field have been Uniscore Inc., formerly Meadowbrook Industries, Delran, N.J., which has also developed a computerized teaching and performance testing tool for the human scorers of essay test answers.

Harcourt Assessment, Inc, formerly The Psychological Corporation, San Antonio, Tex., has developed a computerized scanning and storing system for human scorers scoring essay answers. This system also scores multiple choice bubble answers against a reference data base. Timing marks, i.e., OMR (optical mark recognition), are used to align each test answer sheet scanned. Sheets improperly aligned are rejected and rescanned. OCR (optical character recognition) scanning of each essay or short answer is performed and distributed to a human reader, i.e., a scorer, for scoring.

Bookette Software Company, Monterey, Calif., has developed a computerized optical scanning system for scanning bubble sheets of multiple choice test answers, electronically scoring, and then reporting test results. The system employs templates which contain computer readable images of test questions (question identification), overlay records which contain the coordinates of icons representing the possible answers, and the identification of the correct answers. The reporting takes the form of presenting the test document template at a workstation screen, along with the scanned and scored responses from a selected student, and with an overlay of circles around the correct answers for which the student got wrong. A paper printout is also available.

While these prior developments have advanced the art of automated test construction, automated test administering, automated test question development, computerized bubble answer scoring, and computer-aided human essay scorer performance, these prior developments have not, in whole or in combination, addressed a unified web-based system for the delivery, scoring, and the reporting on-line, of on-line and paper based assessments. Such a new system is multi-functional and multi-modal and would permit the processing of large masses of assessment tests.

With the exception of the previously used on-line, real-time testing and scoring, the prior developments have not addressed significantly increasing the speed of scoring and reporting test results, whereby very large numbers of tests can be scored and reported on in very short periods of time with minimal human intervention.

Contrary to the direction of the present invention, speed enhancements achieved in the prior developments have arisen out of faster scanning machines, the better training for human evaluators, and work volume management of human evaluators.

What is desired is a new development, which would eliminate discrepancies scoring assessment tests which previously have arisen because of the human factors, such as non-standardization, human errors, deviations in judgment, fatigue and boredom, and which new development would also reduce the editing time of each human editor.

What is also desired is an automated system for on-line reporting of test results from plural types of sources and for plural types of test medium.

What is further desired is an automated system, which is human interfaced, where the through-put time in scanning, validating, scoring and reporting of each test is greatly and significantly reduced whereby the turn-around time of scoring and reporting on a test is minimal, thereby providing the educator and the student almost immediate useful test results and thereby a feedback on a student's achievement and test performance.

What is even further desired is such a new development which is web-based and whereof scanned test record is computer analyzed and a human editor of scanned records is computer prompted for making editing corrections to a record.

SUMMARY OF THE INVENTION

An objective of the present invention is to provide an automated Internet-based system for assessments, whereof tests are delivered via the Internet and test results are reported via the Internet.

A second objective of the present invention is that the system receive test responses in multiple formats and process them in a unified manner to produce immediate Internet test reports.

A third objective of the present invention is to digitize the test responses into test records regardless of source, and thereafter subject each test response to a validation process and a scoring process wherein the processing time of these processes is significantly reduced.

A fourth objective of the present invention is to detect errors in test records and to significantly reduce the processing time for editing test records containing errors or containing issues to be resolved.

A fifth objective of the present invention is to provide an auto-correct of each test record.

A sixth objective of the present invention is to provide a human test record editor and automated prompts to the test record editor for error editing.

A seventh objective of the present invention is to provide multi-functional and multi-modal testing, scoring and reporting system with interactive capabilities between a scoring and reporting site and a testing station and/or a scanning station.

These objectives are realized in a computerized system, implemented with hardware and software, for standardized testing, scoring and reporting via a network interface, such as the Internet or a LAN, used for data transmission. A test or test modules are selected from a stored library and assigned to a group of examinees by a test administrator or teacher. A record is made of the test or test modules and the assignment number, the group and the control level are recorded as the need may be. The selected test with its associated assignment number, group and control level identification is made available on-line for web-based assessment testing, or downloaded for paper testing, or both.

In the case of on-line testing, entry of the user name and password is required. This is matched with the user, group, control level and assignment data on the system. The examinee can choose between tests that have been assigned. When an examinee has completed a test or the test time has expired, the test is scored, the results stored in a database, and a reporting subsystem provides the results, i.e., the assessments of student achievement, for Internet reporting.

Otherwise, for paper testing, downloaded tests are saved to the administrator's or teacher's workstation as PDF files and thereafter printed into test booklets. Examinees each record answers to printed tests on multiple choice bubble sheets which are scanned for scoring by an OMR (optical mark reading) scanner(s) at a scanning workstation containing the downloaded validation rules. This scanning occurs at a customer, self-service site workstation, or at a system processing center (plant site) in-house workstation.

Bubble sheets are batched for scanning. During the initial scan of each bubble sheet, the date, time, and batch identification is printed on the bubble sheet. Downloaded software resident at the scanner workstation performs an auto-correct operation for detecting and correcting easily determined and correctable human errors, such as wrong teacher name, wrong date, wrong group, wrong control level or assignment code, gender error, test number error, school miss-identification. The auto-correct corrections appear in the scan record for each bubble sheet.

During the same initial scan operation the software also checks for a first phase of errors using a format algorithm for the bubble answer sheet with the validation information. This algorithm is specific to the test, group, control level etc. First phase errors can include a wrong timing mark, missing identification, miss-entered examinee information and "double" bubbled answers (multiple bubbled). A bubble sheet with phase one scanning errors is selected out into a rejection pile after it is scanned, thereby providing for ease of locating a rejected physical bubble sheet which resulted in an invalid record, and for the visual reading of the rejected bubble sheet by a human editor. Bubble sheets which were cocked or misaligned when first scanned are re-scanned. Other errors are edited at the editor's workstation.

Scan results are displayed at the scanner workstation on a spreadsheet designating the class, or group or batch. Valid records are labeled as "scanned". Suspicious records are labeled as "suspicious" (a suspicious error may be a single letter missing from an examinee name which was not able to be resolved upon auto-correct). Invalid records are labeled as "invalid".

Errors are highlighted on the spreadsheet as prompts to the scanning workstation editor. Either an entire record is highlighted or selected fields are highlighted depending upon the type of errors. The human editor needs only to address the highlighted areas when reviewing the actual bubble answer paper and editing the record. Once the scanned records are each edited, the class, group or batch of records is ready for transmission to a scoring subsystem located at the system processing center (plant site).

As predicate to scoring, a second phase error check may be conducted for second phase errors such as user not found, code not valid, and other more sophisticated errors. Generally this phase finds errors that can only be detected based on pre-existing data such as student information or test codes. This phase two of error checking is conducted by a server located at the system processing center, i.e., the plant site, and prompts are sent to the scanning workstation and its editor screen via the network or internet. Status remarks are entered on records. All records which are accepted are labeled as "accepted". Otherwise, the record is highlighted in a different background color, and an appropriate status code (word) is shown, describing the particular type of error. The editor can then check each rejected record against the hard copy of the data on the appropriate bubble sheet and correct the particular record.

As each scanned record is accepted, it is automatically scored against the answer key for that test. A reporting subsystem makes these reports immediately available on-line for administrators, teachers and other qualified staff members.

The hardware and software for the system is distributed between each customer site and the system processing center (plant site). Communications between customer sites and the system processing center are established as part of the unified web-based system for the various functions selected by a customer and the various modes of test taking, scanning, editing and scoring.

A first communications server, at a processing plant (provider), sends and receives transmissions with customers via the Internet. This first communications server processes on-line testing responses, and on-line reporting requests, and test download requests. Hardware and software resident at the processing plant provides a library of standardized achievement tests, and a database storage for test scores reporting.

A second communications server, at the processing plant (provider), also sends and receives transmissions with customers via the Internet. This particular server communicates only with scanning workstations at the customer's site (self-service workstations) that have custom scanning/editing software installed.

Communications software is resident at each customer workstation which permits on-line assessment, the obtaining of reports and the downloading of bubble test sheets as the functions may be elected and requests made. This software can be a standard web browser, or a secured application.

Custom scanning and editing software is resident at each customer self-service scanning and editing workstation. An expanded version of this scanning and editing software is resident at each plant site, assembly line, scanning and edition workstation.

Reports are available according to provided reporting formats. Reporting software at the system processing center (provider plant site) retrieves scored records (examinee assessments) form a test result database and provides them on-line in accordance with the requested reporting format.

BRIEF DESCRIPTION OF THE DRAWINGS

The features, advantage and operation of the present invention will become readily apparent and further understood from a reading of the following detailed description with the accompanying drawings, in which like numerals refer to like elements, and in which:

FIG. 5 is a detailed block diagram of the web-based system showing, the processing center control and server system, the remote self-serve customer workstations, the on-line assessment workstations, and the reporting structure, with interconnections there between;

FIGS. 9A-B is a logical flow chart for the process steps for assembly line scanning;

FIGS. 10A-B is a logical flow chart for the process steps for scanning, editing and synchronization for the self-service mode;

FIGS. 11A-B is a logical flow chart for the process steps for the standard method assembly line process of scanning, editing and synchronization;

FIG. 12 shows an on-line screen for an on-line assessment workstation;

FIG. 13 shows an on-line activity menu for an administrator or teacher selection screen;

FIG. 14 shows an on-line student portfolio and reports menu;

FIG. 15 shows an on-line test or test module section menu;

FIG. 16 shows an on-line scanning station log-on menu;

FIG. 17 shows a scanning and editing station scanned tests spreadsheet with phase 1 editing prompts;

FIG. 18 shows a scanning and editing station scanned tests spreadsheet with phase 2 editing prompts;

DETAILED DESCRIPTION OF THE INVENTION

The present invention is a computerized system that provides services, utilizing the internet, to a plurality of customers for the selection and delivery of on-line and paper-based standardized tests, for receiving the results of tests for automatically analyzing test records for irregularities and errors, for prompting a scanning workstation editor for editing corrections, for scoring, and for providing interactive reporting of both on-line and paper-based test results, i.e., student or examinee assessments.

Figure 1:
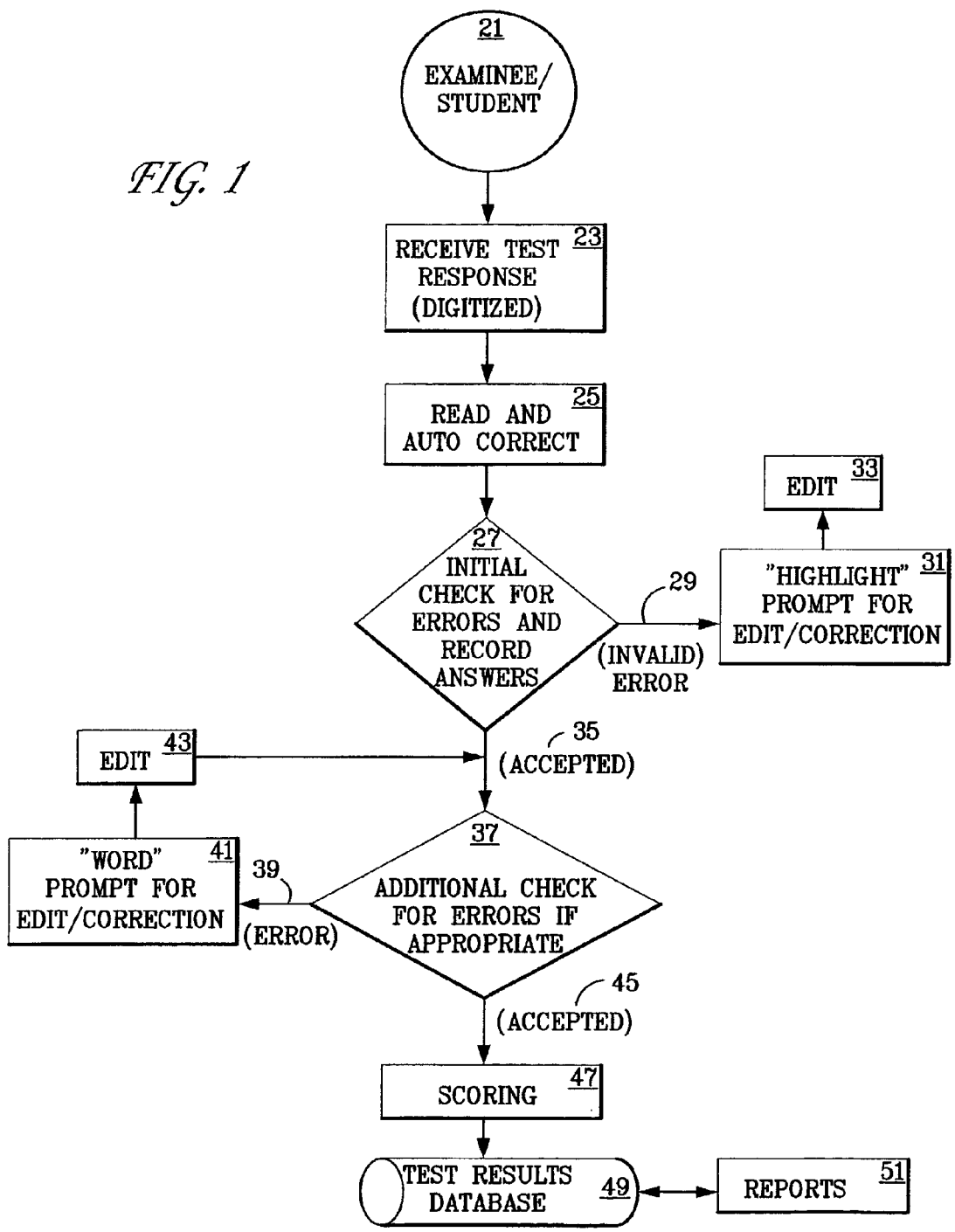
FIG. 1 is a work flow logic diagram for unified testing, scanning, editing, scoring, database accumulation of assessments and reporting.

The fundamental work flow for unified testing, scanning, editing, and scoring and reporting is shown in FIG. 1. A student/examinee 21 provides test responses at the end of a testing period. These test responses are digitized 23, either by on-line dialog, scanning at a customer site, or scanning at a plant site, i.e., the system processing center.

In the case of scanning, the information on an answer sheet is digitized upon scanning and parsed into a linear record having predefined fields which map into fields on the answer sheet. This occurs regardless of whether the information is from a client self-service workstation or a plant site, assembly line workstation. The records are "auto-corrected" by the software for easily resolved errors, such as missing or erroneous date, or missing or erroneous group number, gender, test number school number, or other such easily resolved errors. (For example if gender is blank, or marked "F" and the first name filed is a male name, the gender could be auto-corrected to "M").

An initial check is made of each record, this being a "phase one" check which is conducted by software upon each scanned test record 27. If an error is found, the record status is labeled as "invalid" 29, the scanned test response sheet (or paper bubble sheet) is shuttled into a reject pile and a prompt is placed on the record 31 which is listed in a spreadsheet on a workstation monitor, to be discussed further below. Errors are highlighted on the spreadsheet as prompts, therefore, a prompt appears as a highlight of the record either in its entirety, or in the "field" or column containing the software determined error or errors. Phase one errors require the scanning/editing person to pull the invalid test answer bubble sheet from the reject pile and inspect it in the area(s) prompted on the record spreadsheet at the workstation monitor.

Phase one errors include missing names or other individual, examinee information, missing identification, timing mark errors, and double (multiple) bubble answers. The human editor then edits the scanned record on the spreadsheet by typing in the corrected information 33 into the record. The software monitors (checks on) the record changes as it had in step 27, and determines when a record is accepted 35, whereupon a "scanned" status label is entered on the spreadsheet at the workstation. The scanning editing person edits each invalid record in turn until the entire "batch" of record on the spreadsheet is labeled as successfully "scanned".

The correct scanned test records are then transmitted to a system processing center via the Internet or via a LAN, as the situation may be, where each received record in a batch is again checked for errors, as a second phase error check 37. Phase two errors include: user not found, code not valid, and other errors which may arise in transmission. Each scanned test record for which a phase two error is found 39 results in a prompt 41 which is a "word" prompt or "instruction" prompt placed in the status field of the record, which then is read in the spreadsheet on the monitor at the scanning and editing workstation monitor. The scanning/editing person then manually edits 43 each prompted record until it is accepted 45 and an "accepted" status appears on his workstation spreadsheet line for that record.

As each record is submitted or synchronized into an "accepted" status, the record is scored 47. The scores with the examinee and institutional identification are stored in a test results database 49. Reports are generated 51 from this database 49 upon inquires from customers via the Internet.

Figure 2:
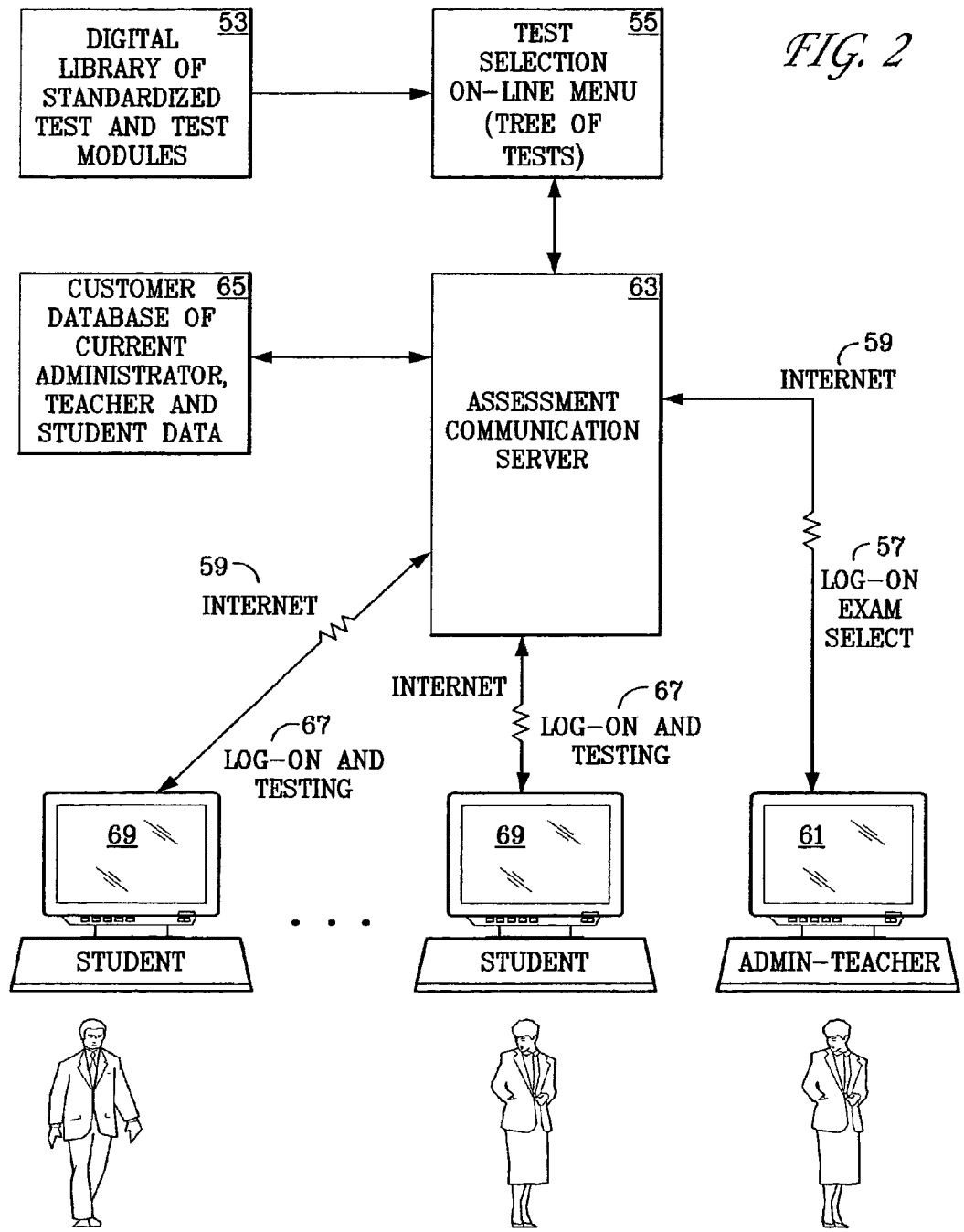
FIG. 2 is a general block diagram for on-line testing.

On-line testing, FIG. 2, draws upon a digital library 53 of standardized achievement and assessment tests and modules for such tests. A portion of the content of such library 53 is displayed as test selection menu 55 as a result of a log-on and exam request and selection 57 via the Internet 59 from an administrator or a teacher working from a customer site workstation 61.

The administrator or teacher logs on from his workstation 61, FIG. 2, into an application that is connected via the internet to an assessment communication server 63 at the system processing center (plant site). A customer database 65 is interrogated by the application via the assessment communication server 63, for current administrator, teacher, student and curriculum data. This information in addition to the exam request information 57 allows the assessment communication server 63 to access the digital library 53 and construct the test selection menu 55, which is displayed via the Internet 59 at the administrator/teacher workstation 61. The administrator/teacher selects a test and makes an assignment of that test to a group of students. Each assignment may have associated with it an identification number for the test. When the assignment number is entered as part of a student's test response or bubble sheet entry, this number identifies the student who is taking the test, the class and school. A group number is used if desired. A control level, for which the reporting may be grouped, such as the state, school district or class, may also be used.

This test information and the assignment information is stored in the assessment communication server 63 associated database for the students to take an on-line assessment. Each student logs-on with a user name and password 67 from an individual workstation 69. This communication 67 prompts the on-line testing 67 to begin. Following the taking of the test the student submits the test 67 for scoring and ends the session.

Figure 3:
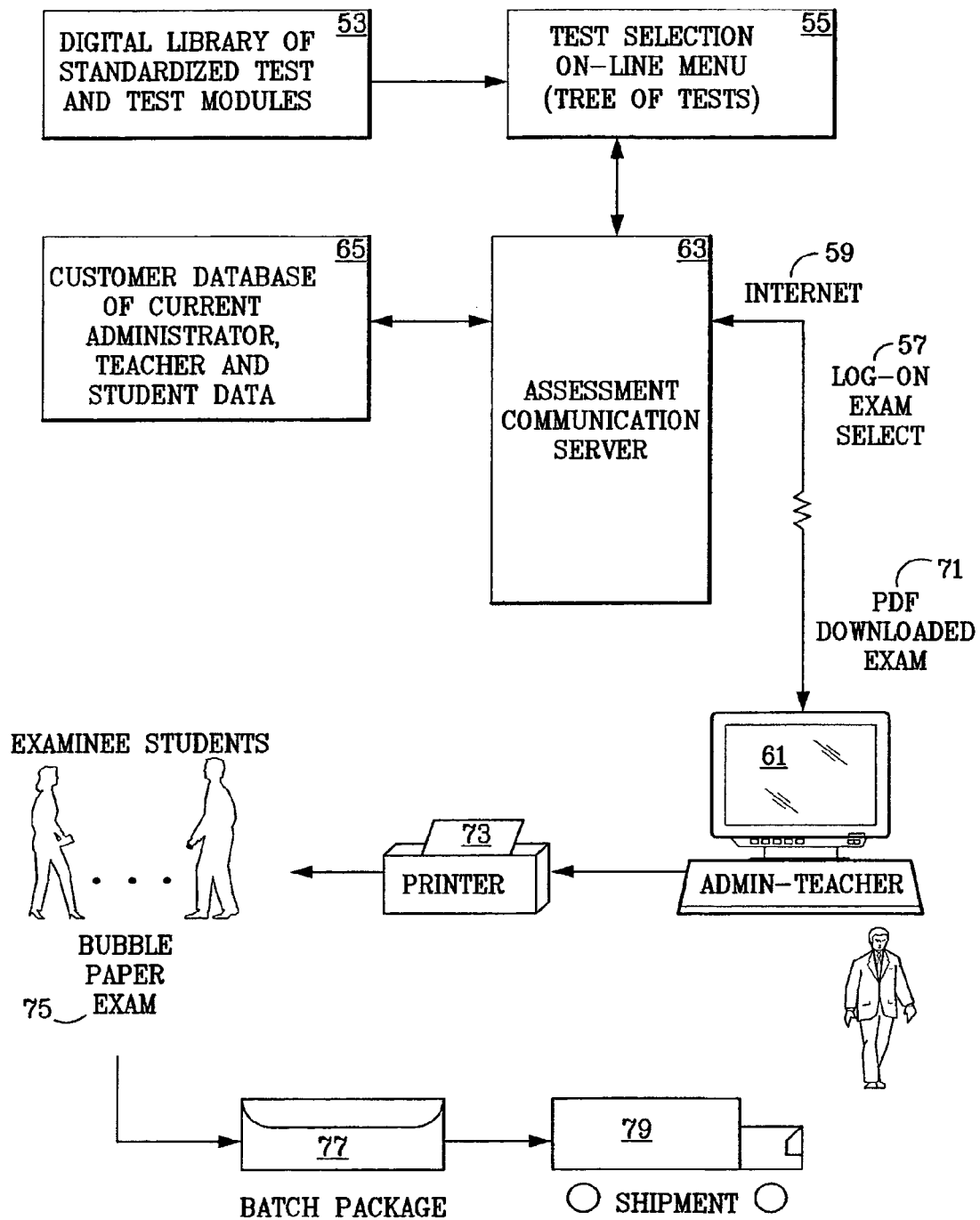
FIG. 3 is a general block diagram for customer site testing utilizing examinee bubble answer sheets and system processing center scanning and editing.

The testing scheme is unified with on-line communications between a customer and the system processing center regardless of the testing mode, or scanning functions selected. An administrator or teacher could elect to have the students take paper assessment tests, FIG. 3. In this mode, the same log on, exam request and exam selection 57 is made on-line 59 from the customers workstation 61. The same routine for communications, data acquisition, and assignment is made through the same assessment communication server 63 at the system processing center. That assessment communication server 63 is in contact with the same customer database 65, digital library 53, and generates the same test selection menu 55.

However, in this mode, the customer opts to download the selected exam. In that situation the selected test is downloaded 71 in PDF format to the customer workstation 61 and stored. The customer may then log-off.

The test is then printed from the customer workstation 61 via a customer, on-site, printer 73. Usually the test printout is in a form of an examination booklet including testing instructions, structured sections of questions, and instructions for filling out the student or examinee information, school, class, teacher, school district, state, test number and other data on a bubble sheet 75 3, i.e., paper multiple choice answer sheet.

In this mode, the teacher collects the bubble sheets 75 after the exam. The bubble sheets 75 collected, whether from a class, a grade, a school, or a school district are packaged 77 for shipment 79 to the system processing center (provider plant site) for paper scanning, scoring and reporting. Reports are available on-line, in customer acceptable predetermined formats, just as with the on-line assessment mode previously discussed.

Some customers may elect to keep the hard copies of the bubble sheets 75 on-site. In that instance a customer instead elects to scan the bubble sheets with its on-site scanner 81 and create scanned records on-site, FIG. 4. In this mode, a dedicated self-service communication server 83, at the system processing center communicates on-line with the application being used by an administrator or teacher workstation 61 at the customer site. The customer log-on and exam select 57 operations are the same as with the previous two modes. The self-service communication server 83 is connected to the digital library 53, the customer database 65 and the test selection menu 55 in the same manner as the assessment communication server 63. The two servers 63, 83 access the peripheral equipment on a TDM (time division multiplex) basis.

Figure 4:
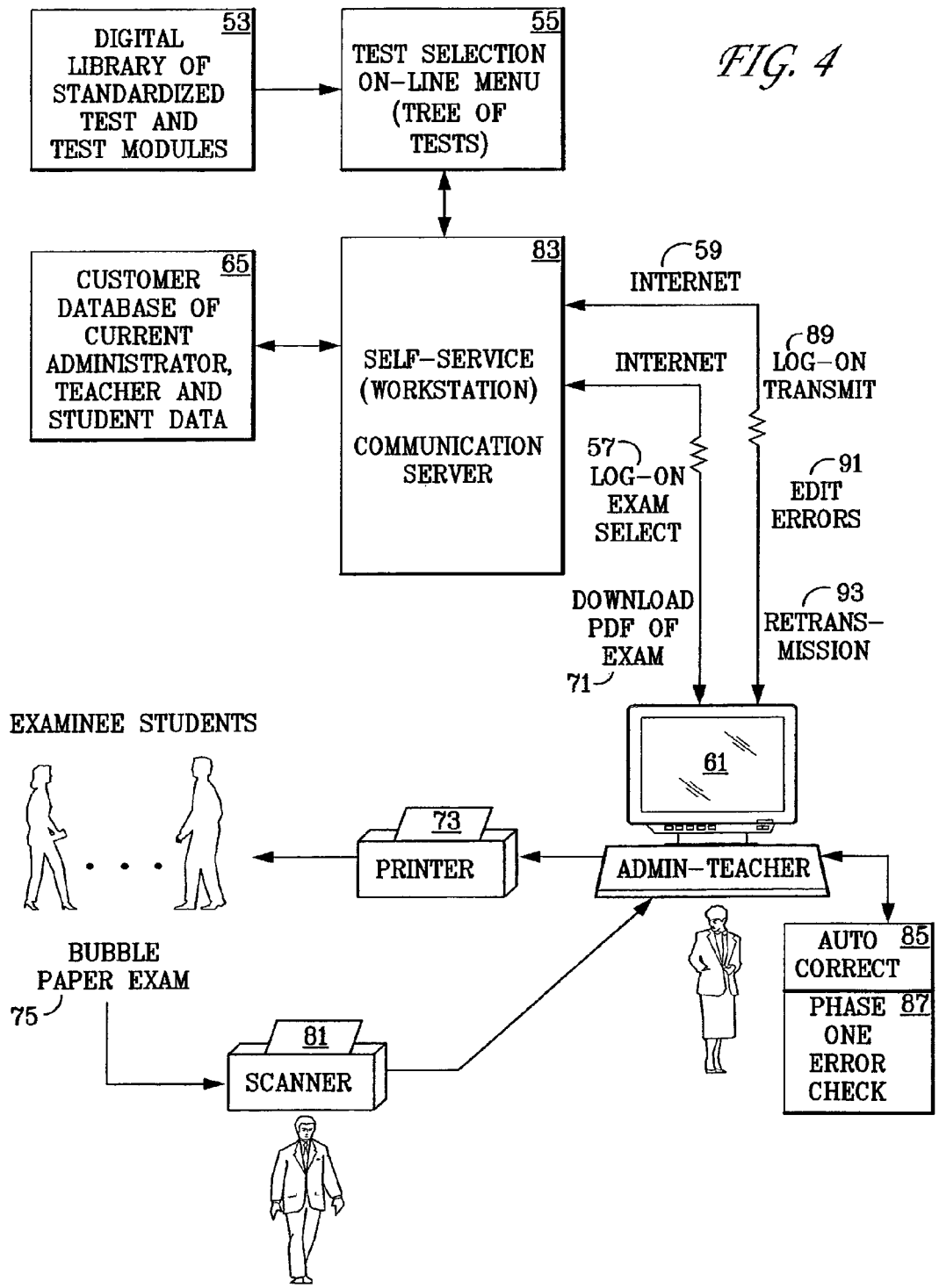
FIG. 4 is a general block diagram for customer site testing utilizing examinee bubble answer sheets and customer site, self-serve, scanning and editing.

In the self-service mode, FIG. 4, the plant site communication server downloads the selected exam in PDF format 71 to the customer workstation 61. The exam may be saved on the customer's workstation 61, where after the customer may log-off. The assessment examination may then be printed 73, at the customer site into exam booklets, at the teacher's election.

The students are administered the test and answer on bubble sheets 75. The customer then scans each bubble sheet 75 with its in-house scanner 81. The output of the scanner 81 is connected to the customer workstation 61, which has been downloaded with custom auto-correct 85 and phase one, error checking software 87. The auto-correct software 85 and the phase one error checking software 87 perform the respective operations previously discussed. Bubble sheets with invalid scanned records are automatically placed in a reject pile.

The workstation 61 monitor displays a spreadsheet of scan records for the bubble sheets 75 scanned. Suspicious and invalid records are highlighted with "highlighted" editing prompts as previously discussed with respect to phase one scanning and editing with respect to FIG. 1. The customer (administrator or teacher) performs phase one editing of the scanned records at the customer site.

Once the spreadsheet for a batch of scanned test records contains all corrected records which then all receive a "scanned" status from the auto-correct and phase-one error checking software 85, 87, the customer may log-on with the provider at the system processing center (plant site) self-service communication server 83, or the customer may have been on-line from the time of the initial scanning, error checking and phase one editing. After completing phase one editing in response to prompts from the customer workstation 61 resident software, the customer transmits 89 (i.e., uploads) the batch of scanned test records to the system processing center's self-service communication server 83 via the Internet 59. In any communication by the self-service customer with the plant site server, sufficient identification is made to correlate the batch of test records with an assignment number, control level and of other information identifying the examinees, the test they had taken, and how it was to be reported.

Phase two error checking, as discussed above, is then immediately conducted at the system processing center and edit errors, i.e., phase two "word" editing prompts are transmitted 91, FIG. 4, to the customer workstation 61. If the self-service customer was on-line with the plant site server 83 during the customer phase one editing this upload is spontaneous as the phase one editing of each record is complete. If the self-service customer edits off-line and then logs on, the upload occurs after log-on and the phase two editing prompts appear at the customer's workstation. If the self-service customer performs phase one editing while on-line, the phase two editing prompts occur immediately. Once phase two editing is completed on a record, the record is scored and placed into the production database.

In phase two editing, when the appropriate record changes are made, the "status" of a record changes from an editing prompt, such as "user not found" or "code not valid" to "accepted". As each record is successfully accepted, the system scores the records and stores the scored records in the test results database.

Figure 5:
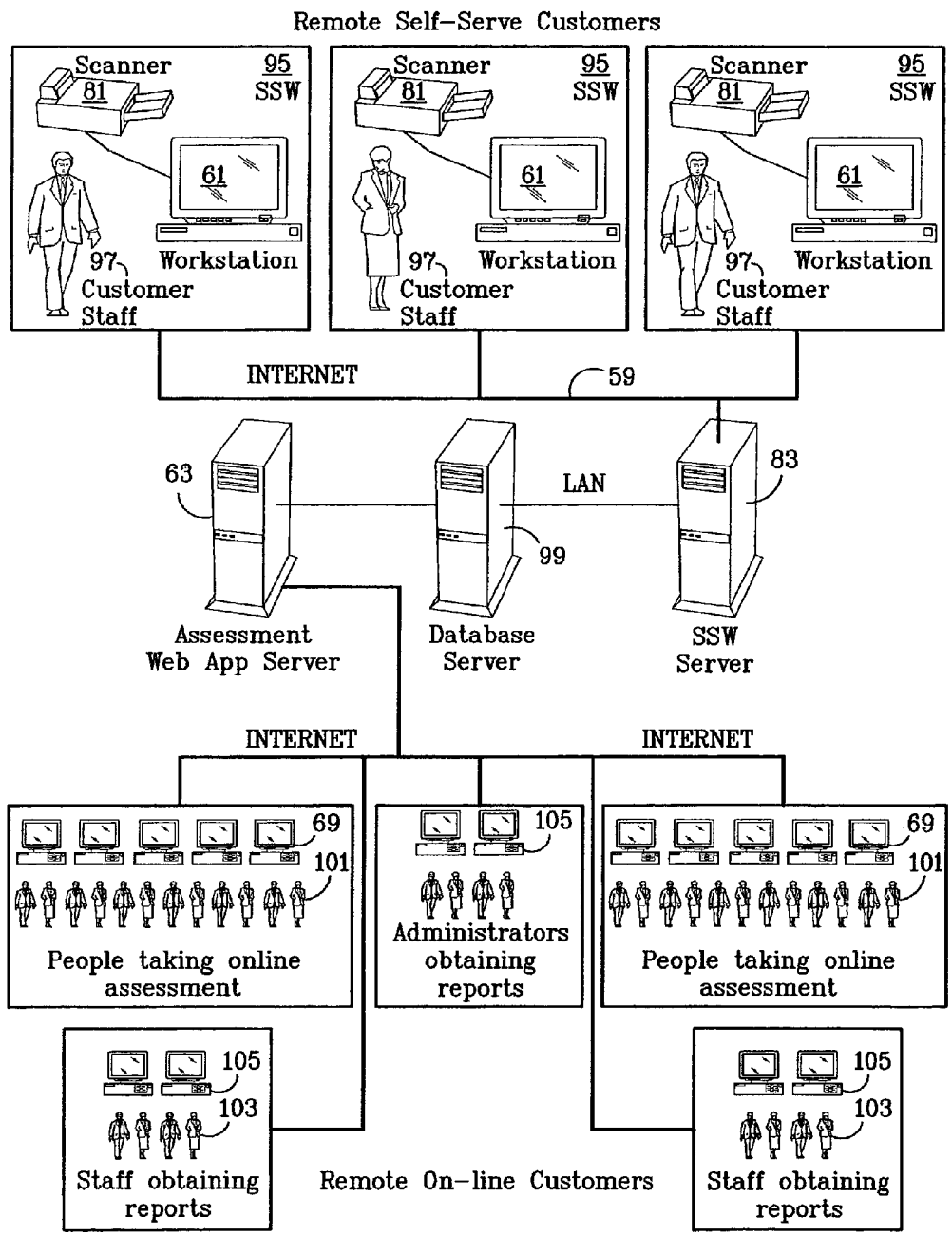

The Internet 59 compatibilities of the invention are further understood from FIG. 5, where a plurality of self-serve workstation sites 95 can be on-line with the self-service (workstation) communication server 83. Each workstation site 95 includes the computer workstation 61 containing scanning, auto-correct, phase one error checking and prompting, and communications software. A scanner 81 is connected to the workstation computer 61 and both machines are manned by customer staff 97.

At the system processing center, FIG. 5, the self-service communication server 83 is connected to a database server 99, which in turn is connected to the assessment (web application) communication server 63.

A plurality of examinees 101, FIG. 5, taking on-line assessment tests on individual student workstations 69 are on-line with the assessment (web application) server 63, while at the same time administration staff members 103 are on-line requesting and obtaining reports though administration workstations 105. The student workstations 69, the administration reporting workstations 105, and the teacher workstations 61 each have browser software for performing all web-based communications.

Figure 6:
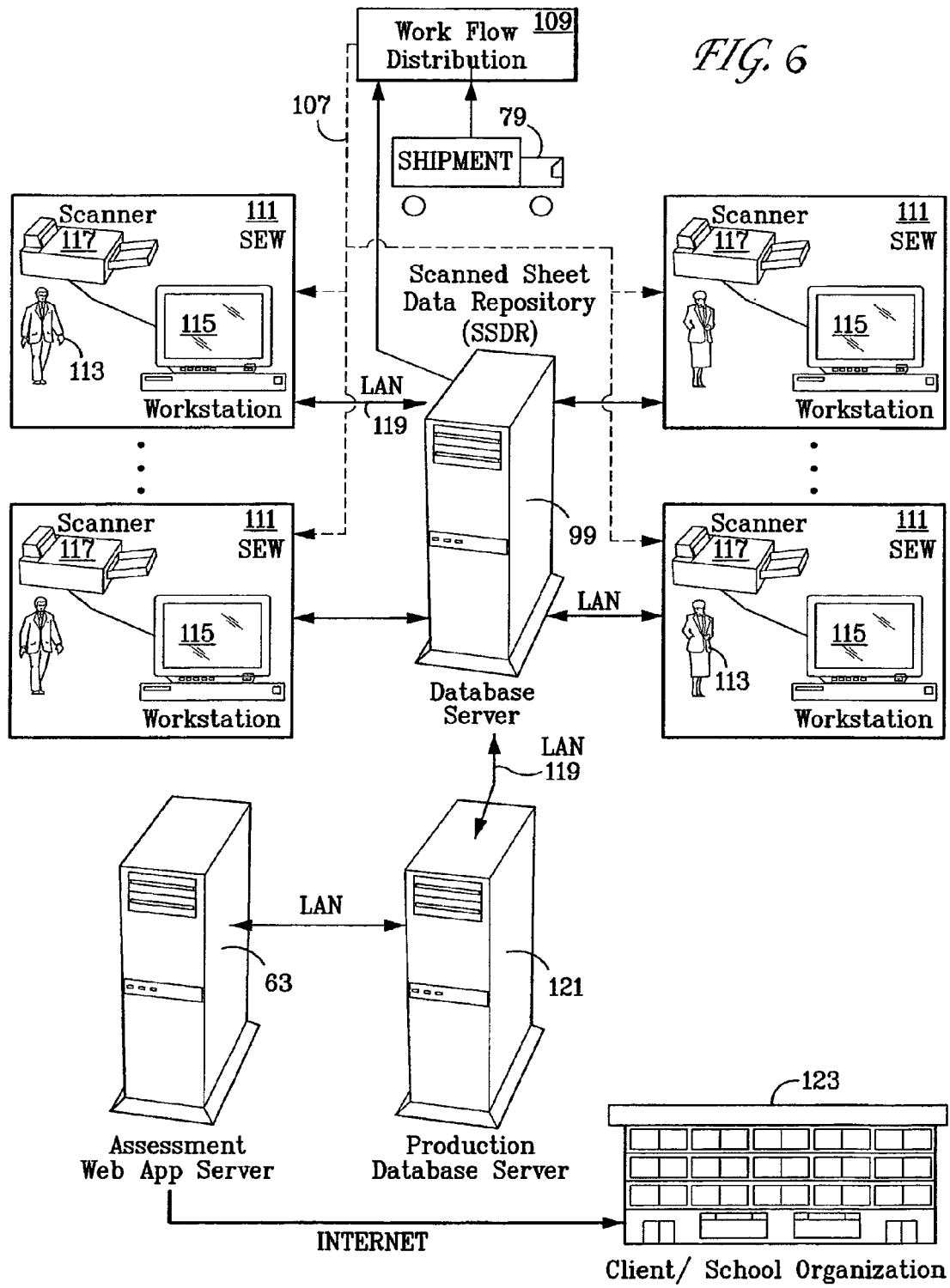
FIG. 6 is a block diagram of the processing center control and server system, and plant site scanning and editing workstations.

At the system processing center, FIG. 6, the shipments 79 of batches of test bubble sheets 75 are received from customers, and the paper 75 distributed 107 under the direction of a work flow distribution station 109 to a plurality of simultaneously operating, plant site scanning and editing workstations (SEW) 111. Each SEW area 111 is manned by a plant employee 113, who operates a SEW workstation terminal 115, which may or may not be connected to a bubble sheet scanner 117. Auto-correct software 85 and phase one error correct software 87 are available to each SEW workstation terminal 115.

Each plant site (SEW) workstation 111, i.e., its workstation terminal 115, is connected to a database or file server 99 though a local area network (LAN) 119. At each workstation terminal a (scanning and editing workstation) SEW employee 113 performs hand-editing in response to software prompts. The server 99 operates as a scanned sheet data repository (SSDR). This server 99 may, alternately, be programmed to function as the database or data storage unit (central data storage mechanism) for each of the plant site 111 and off-site, self-service workstations 61.

A further server may be employed, such as production database server 121 which is connected to the SSDR server 99, FIG. 6. This product database server 121 is not shown in FIG. 5, but should be understood that its functions are present in its functions, and it may be implemented in connection with the circuitry of FIG. 5 as a stand alone unit in a LAN connection with the database server 99, or its functions incorporated into that unit shown in FIG. 5.

The production database server 121 stores the data for each assessment made and assembles data necessary for a report. The resident software is specific to searching specific control level data and retrieving that data necessary to "build" a requested report.

The assessment (web application) server 63 is connected through the LAN 119 at the plant site to the production database server 121. The assessment communication server 63 receives assessment report requests from the requesting staff 103, FIG. 5, retrieves the necessary data from the production database server 121 and generates the report screen 123 with the data therein, at the administration reporting workstation 105. While a customer/teacher workstation 61 is shown above to have distinguishable functions from an administrator reporting workstation 105, it is understood that the appropriate software may be loaded into either or both, thereby permitting separate of dual functions, respectively.

Figure 7:
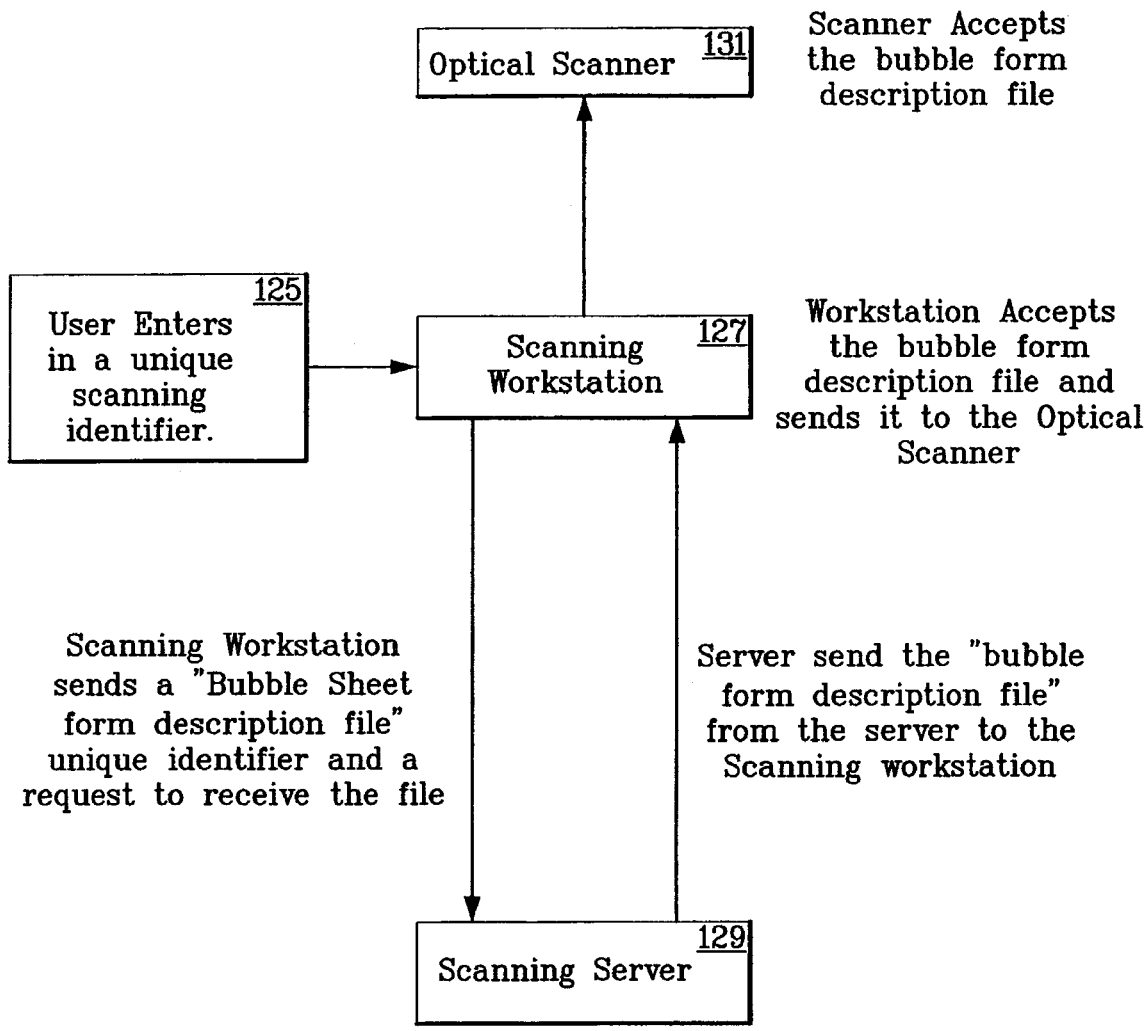
FIG. 7 is a general block diagram for dynamic scanning and form mapping.

The system incorporates dynamic scanning form mapping system software with controls (control instructions) for the bubble sheet scanners 81, 117. A flow diagram for the functioning of this software is shown in FIG. 7. The form mapping applies to the bubble sheets and the dynamic reading or mapping of a scanned form with decision making being performed as each sheet is passing the scanning head. This permits the software to make auto-corrections to a scanned test record as it is being made (complied) and to generate phase one prompts to the record as it is being written to a workstation 61, 115 monitor, before the bubble sheet has cleared the scanner head. As a bubble sheet is clearing the scanner head, a "scanned" or "invalid" instruction is generated, written on the record, and an instruction is sent to a document sorting mechanism in the scanner 81, 117. This mechanism either "kicks" the particular bubble sheet into a reject pile or not.

The dynamic scanning form, mapping system includes an entry terminal 125 connected to a scanning workstation 127, FIG. 7. The scanning work station communicates bi-laterally with a scanning server 129. An optical scanner 131 (OMR scanner) receives instructions and control signals from the scanning workstation 127.

The dynamic scanning and form mapping structure shown in FIG. 7 may either be stand-alone or embedded in other structure. The user enters a unique scanning identifier 125 into a scanning workstation 127. This scanning identifier defines the physical configuration of the bubble answer sheets to be scanned, including the location of identification data, the location and number of timing marks, the locations of multiple answer lines, and of other data needed to define the layout and configuration of a bubble sheet form about to be scanned.

In response to the scanning identifier 125 entered into it, the workstation 127 sends the unique identifier for the specific bubble sheet form to the scanning server 129 with a request to receive a stored bubble form description file. This file is sent to the workstation 127, which then sends instructions and control signals to the optical scanner 131.

Figure 8:
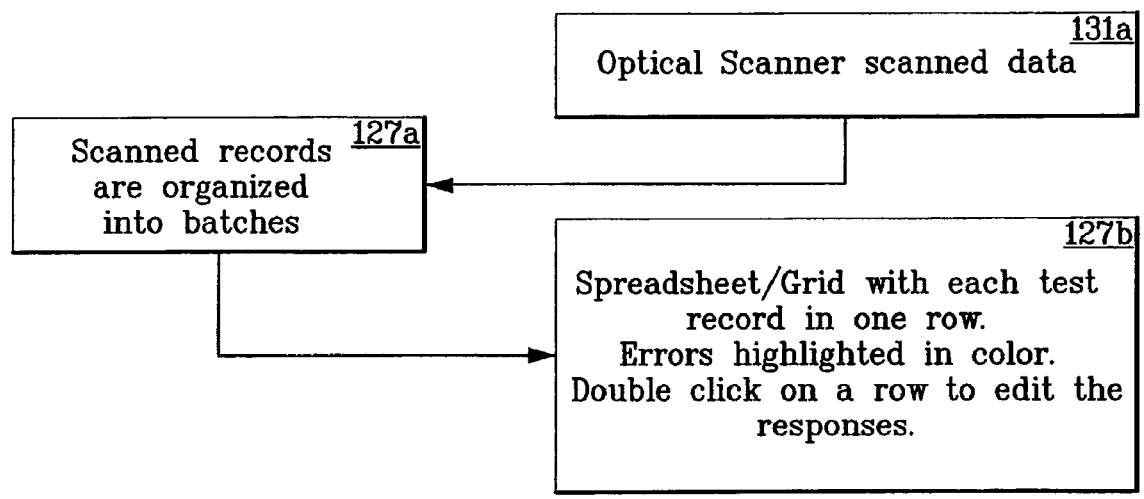
FIG. 8 is a general block diagram for the system scanning and editing of test responses.

The system on-the-fly scanning, auto-correcting, error checking and error prompt generation organization is shown further in FIG. 8. Scanned data 131*a* from the optical scanner is sent to the scanning workstation. Scanned records are organized into batches 127*a*. A spreadsheet grid with each test record in one row is written, with errors being highlighted in color 127*b*. The human editor double clicks on a row to make that row available for editing from his workstation keyboard 127*b*.

The system may operate under the control of any of several operating systems, with interconnected hardware operating under independent software operating systems. The workstations 61, 81, 127 are generally implemented with a PC (personal computer) with WINDOWS operating systems. The invention's proprietary scanning and editing software, if downloaded into a self-service workstation PC can be implemented in a number of programming languages, which are compatible with the WINDOWS platform, including VISUAL BASIC.

Internet communications software resident in the plant site servers is implemented in JAVA programming language following standard TCP/IP protocol.

The scanners 81, 117, 131 are commercially available from venders as Scantron Corp., Tustin, Calif., such as model 6500. The servers 63, 83, 99, 121 are available from various manufacturers, including IBM, Compaq, Hewlett-Packard, and Dell, running a UNIX operating system. The database and report generating software may be implemented with a commercial relational database system. Editing logic software resident on the servers may be written in any of a number of programming languages which run on a UNIX platform, including: C, C++, and VISUAL BASIC programming languages.

The LAN network 119 generally includes a router (not shown). Where very fast transfer rates are required, dedicated buses may be incorporated in place of LAN bus networking (routing).

Figure 9B:
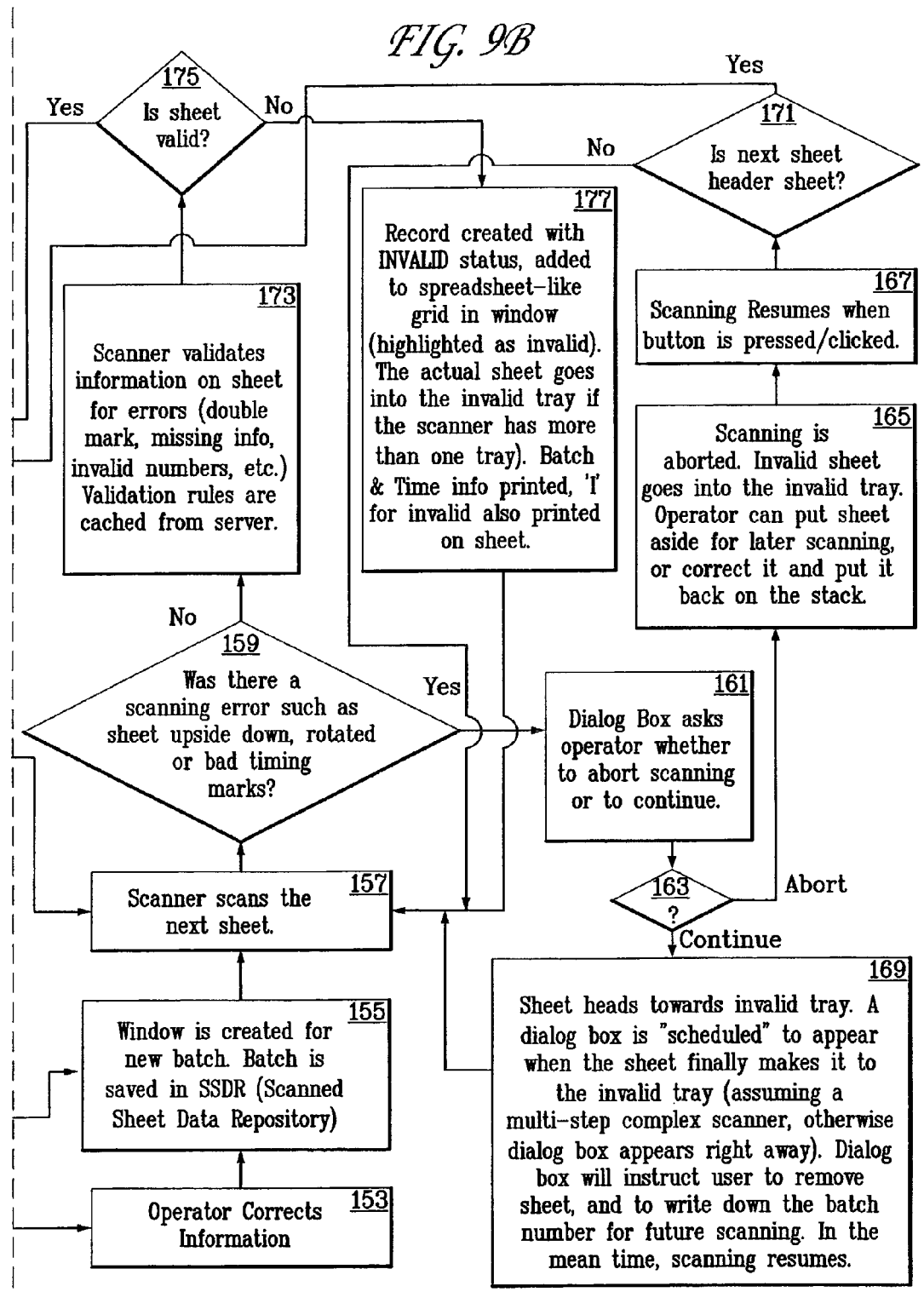

The invention's proprietary software controls the process steps of the system, except for human implemented operations. FIGS. 9A-B illustrates the logic flow of the process steps for assembly line (plant site) scanning mode. A scanner is turned on and the application software for this subsystem portion is started, step 135. A form I.D. is entered on the log-in page to specify the layout sheet, validation rules, and specific repository of information and the customer logs-in with this information, step 137. Then a spreadsheet grid is generated on the monitor of the workstation with each representing a "batch". If no batches have been scanned, the grid is empty except for the headers on the columns, step 139.

Thereafter the customer/workstation operator loads one of more batches of bubble sheets into the scanning tray and initiates scanning, step 141. Each batch is headed by a header sheet which defines the fields of information for each scanned record. The batch header sheet is scanned by the scanner, step 143. The software determines if there was a scanning error, such as a sheet upside down, or rotated/cocked, or bad timing marks, step 145. If there is such an error detected, then the scanning is aborted and the customer/workstation operator is alerted and the header sheet is fed to the error/reject tray, step 147. The operator corrects the header sheet and places it back on the stack of bubble sheets to be scanned, step 147.

If there were no scanning errors at step 145, then the fields in the header sheet are examined for validity of the type of data to be entered into each field, step 149. If the fields are not valid, a window appears on the customer/workstation monitor showing the fields read from the scanned sheet and instructing the operator to correct the information on screen, step 151.

The operator then corrects the information from his workstation keyboard against the header field definitions, step 153. Field information initially determined correct in step 149, and corrected field information from step 153 is then created into a window for the new batch, step 155. This header information for the batch is then saved in the SSDR server, step 155.

The scanner then continues to scan the next sheet, step 157. An error check is made for errors, such as, sheet upside down or bad timing marks, step 159. If such errors are found, d dialog box appears on the workstation monitor which asks whether to abort of continue scanning, step 161. If the operator aborts, step 163, the scanning of that sheet is aborted and the sheet is shuttled to the rejected tray, step 165. Having done this, the sheet may be later scanned or corrected and placed back in the scanning stack, step 165.

Thereafter, scanning of the next sheets resume when the operator clicks/pushes the activity button, step 167 the operator elects to continue scanning, the sheet is kicked to the invalid tray and a dialog box appears instructing the operator to remove the sheet, record the batch number for future scanning, and then scanning resumes, step 169.

Once exiting step 167, the program interrogates if the next sheet is a header sheet, step 171. If it is a header sheet, the program returns to step 143. If it is not a header sheet the software driven process returns to step 157.

Once step 169 is completed the software driven process returns to step 157.

If the software driven process at step 159 determines there was no appropriate scanning error, then the scanner validates the information on the sheet and checks for other phase one errors, such as, double answer marks, invalid information using validation rules cached from the server, step 173. This creates a data on the status of the scanned sheet wherein, in the next step 175, the software program determines if the sheet scanned record is valid or not. If it is not valid, a record is created with "invalid" status, step 177, and entered on the batch spreadsheet workstation monitor report; and the actual paper bubble sheet is shunted to the rejected tray at the scanner, step 177. Batch and time information and an "invalid" designation, such as an "I", is printed on the rejected paper bubble sheet, step 177. Following this step 177, program returns to step 157, where the scanner scans the next bubble sheet.

If at step 175, the software program determines that the sheet scanned record is valid, then the program creates a record which inserted into the SSDR server database and added to the spreadsheet on the workstation monitor, step 179. Following this step 179, the program returns to step 157 to scan the next bubble answer sheet. The process continues until all sheets are scanned, and all errors are edited, and/or the process is manually terminated by the operator. As a result of this process, FIGS. 9A-B, all test answer sheets in a batch assigned to a plant site workstation have been successfully scanned and the records phase one edited and corrected, and the valid records stored in the appropriate server.

Figure 10B:
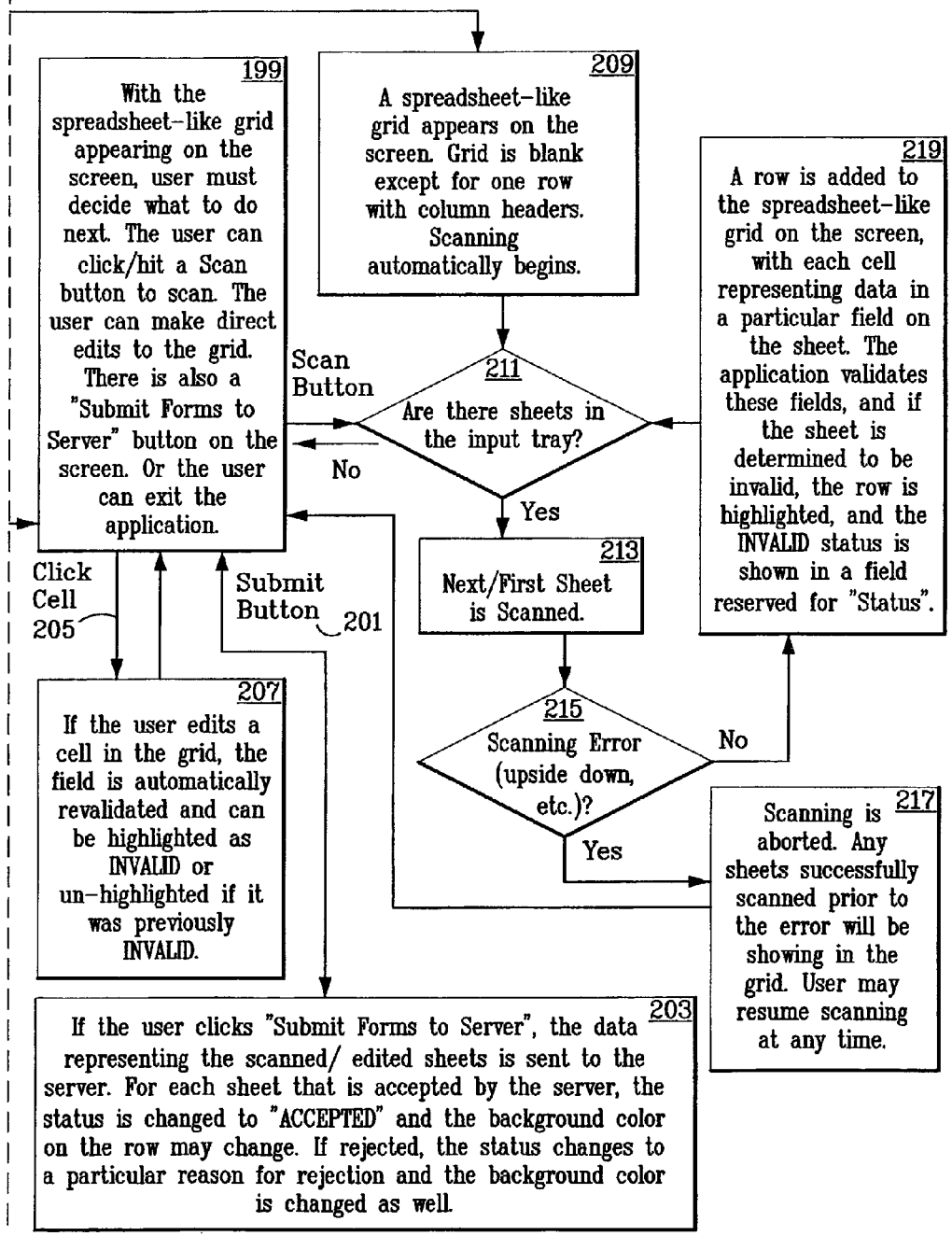

FIGS. 10A-B illustrates the logic flow for the process steps of scanning, editing and the synchronization for the self-serve mode. The customer site scanning and phase one editing, being the self-serve mode software application program is started, step 181. The customer logs-on and enters the test form I.D. number and the customer identification key, step 181. The application software connects to the SSW server to authenticate the form I.D. number and customer key, step 183. Further, as part of this step 183, the system software automatically downloads the dynamic form definitions and validation rules. The SSW server determines if there are log-in problems, step 185, and if so returns the process to step 181.

If there are no log-in problems detected, the software determines if this user previously scanned forms (bubble answer sheets) using the entered form I.D. on the particular workstation/machine, step 187. If yes, then a dialog window is displayed on the customer/user monitor asking if he would like to load sheets from memory or scan new bubble answer sheets, step 189. If the operator enters (selects) that he would like to scan new sheets, step 191, the software then instructs the operator to turn on the scanner, load the bubble sheets into the input tray and hit the scan button, step 193. Similar instructions, i.e., step 193 is also performed, where as a result of step 187 the software determines that the operator did not previously scan forms using the present form I.D. number on the same machine.

Once the dialog inquiring on scanned data or new scan, step 189 is displayed, and the operator elects to load previously scanned sheets, step 195, a spreadsheet is formed on the operator workstation monitor, step 197, wherein each row represents a previously scanned test record, and invalid fields are highlighted to prompt the operator for editing, step 197.

The operator must then decide to initiate scanning or initiate direct editing on the spreadsheet, step 199. In this step 119, there is also an operator initiated submit forms to server instruction, or alternatively, the operator can abort (exit) the application. If the submit to server button is "clicked", the spreadsheet data representing the batch of scanned and edited test records is transmitted to the system process center server, step 201. For each record which is accepted by the server, the spreadsheet record status is changed to "accepted", step 203. If the record continues to be determined invalid and rejected, the reason for rejection is indicated in a word prompt by the process center server, step 203. Such word prompts include, "user not found" and "code not valid".

In step 199, the operator can elect to edit a "cell" in the spreadsheet grid, step 205. This being done, the operator edits the cell in the grid and the field is automatically revalidated and is highlighted as invalid or un-highlighted if previously invalid, step 207. The process then returns to step 199.

Following step 193, the software produces a spreadsheet grid on the operator workstation monitor which is blank except for headers and scanning of bubble sheets automatically is begun, step 209. The software then determines if there are sheets in the scanner input tray, step 211. If there are no sheets the program turns to step 199. If there are sheets the next (or first) sheet is scanned, step 213. Thereafter the software checks for initial scanning errors, step 215.

If there are initial scanning errors, scanning is aborted and any bubble sheets successfully scanned prior to the error have their scanned records shown on the spreadsheet grid, step 217. At this time the operator is prompted and may manually click to resume scanning, step 217. If the operator elects to manually resume scanning the process turns to step 199.

If in step 215 there are no initial scanning errors detected, then the scanned data is added to the spreadsheet grid, as an additional scanned record, step 219. On that grid, each cell represents the data in a particular field. The software validates these fields, and if the data record is determined to be "invalid", the row on the grid is highlighted and an "invalid" status is entered, step 219. Following step 219, the process returns to step 211.

Figure 11B:
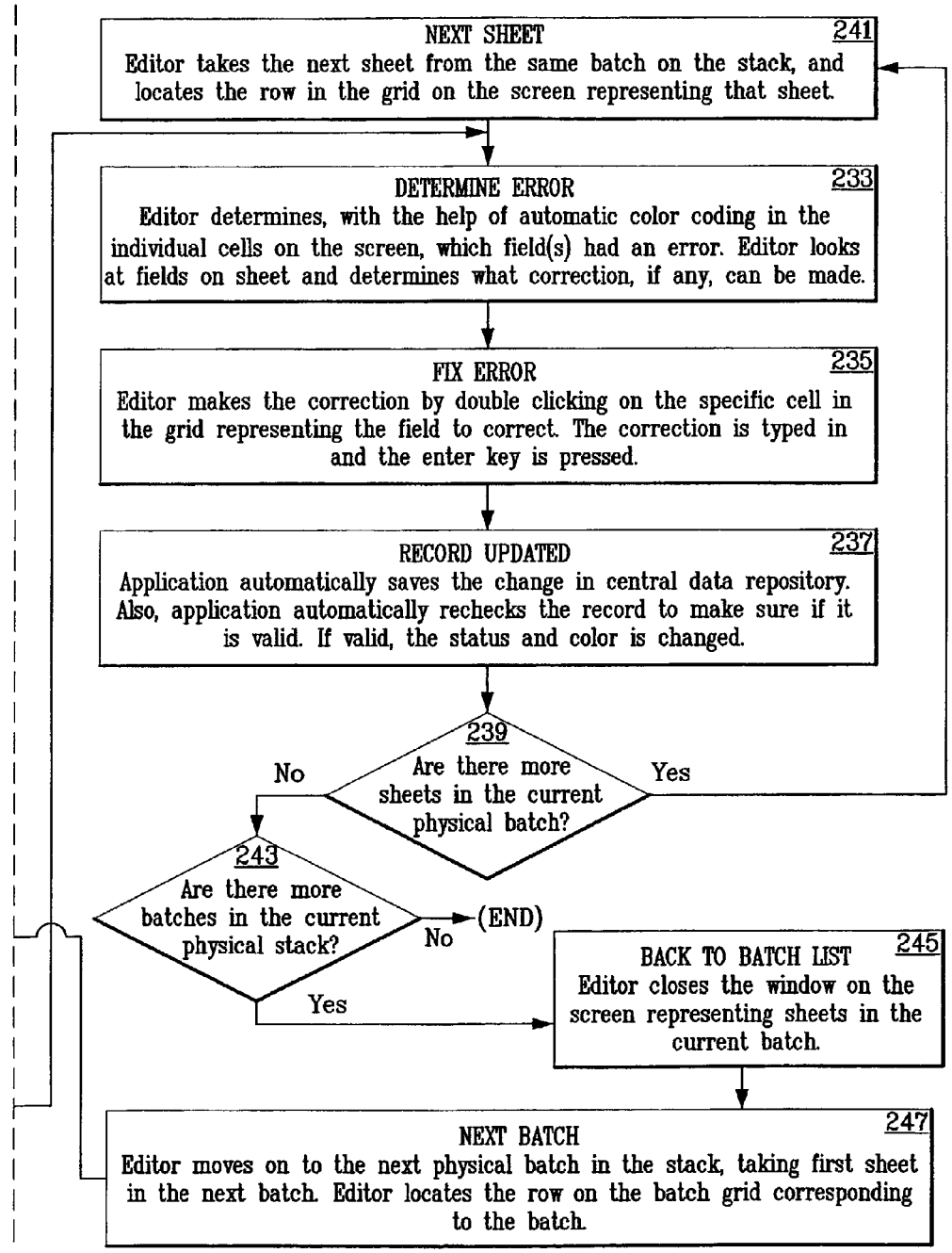

FIGS. 11A-B illustrates the process for standard method of editing in the plant site assembly line process mode. This process can be performed after all of the bubble sheets at any work station had been successfully scanned to the point where a phase one error checking had been completed, but no editing has been performed. Here an operator/editor at a system processing center (plant site) workstation 111 selects (had previously selected) a physical batch of bubble answer sheets delivered to his workstation, step 221, and has (previously) scanned them to produce a reject stack, step 221, a scanned stack, and a previously stored invalid (rejection) record of error prompts. These bubble sheets are grouped by batch with a header sheet or other divider at the beginning of each batch.

In this process, the scanning editing application software is started, step 223, and the operator/editor logs-in, which operation includes entering the form ID number and the customer pass code (key), step 223. The software generates a spreadsheet grid which is displayed on the workstation monitor showing the batches that were previously scanned associated with the keyed in form I.D. and customer pass code, step 225. Each batch is displayed in a row and batches with errors are highlighted. The grid is sortable by school, date, control level, assignment number, etc., step 225.

The editor then locates a batch of interest, step 227, and locates the row of the spreadsheet grid corresponding to that batch, step 227. Then a batch row is selected, step 229. Here the operator/editor double clicks on that batch row which brings up a new spreadsheet screen (window) with the individual records of the selected batch, step 229. This spreadsheet is the product of that batch screening of individual bubble sheets previously conducted. The editor then locates each spreadsheet line, representing an "invalid" record which he intends to edit.

The editor looks through the rows on the screen which are highlighted (in red) that represent the invalid (rejected) bubble sheets, step 231. Thereafter the editor matches each highlighted row to the respective bubble sheet, one at a time, step 231. The software also highlights the individual field, i.e., the cell on a row with a color coding designating an edition prompt, step 233. Here the editor determines which fields have an error then inspects the bubble sheet for that field of information, and determines what correction, if any can be made, step 233.

The next step 235 is fixing an error. The editor makes a correction by double clicking on the specific cell in the grid representing the field to be corrected. The correction is then typed in and the enter key is pressed, step 235. Then the record is updated, step 237. In this step, the application automatically saves the change to the central data depository, i.e., SSDR database server 99, and then automatically checks to record to make sure that it is valid, i.e., "accepted". If accepted as valid, the application software automatically removes the highlight color and upgrades the status as "accepted", step 237.

Thereafter, the operator/editor determines if there are more sheets in the current physical batch, step 239. If step 239 determines more sheets, the next sheet from the same batch is obtained by the editor and then he locates the row in the spreadsheet grid on the workstation monitor which represents the scanned record for that bubble sheet, step 241. Thereafter the process turns to step 233.

If it is determined that there are no more bubble sheets in the current physical batch, step 239, then the operator/editor determines if there are any more batches in the physical stack (of rejected bubble sheets), step 243. If there are more batches, then the editor closes the window on his monitor which represents the sheets in the current batch and returns to the batch list, step 245.

The operator/editor then moves on to the next physical batch in the stack, step 247. In this step, the editor takes up the first bubble sheet in the next batch and locates the row on the batch spreadsheet grid, on the batch window, corresponding to the new batch, step 247. The process then turns to step 229.

If at step 243 it is determined that no more batches are left in the physical stack, this process portion of the invention ends.

FIG. 12 shows a web-based logon screen for the invention. The user enters his name and password and signs in.

FIG. 13 represents an activity menu web-based selection screen for the invention. The "buttons", i.e., the select functions are customized for a particular customer's needs. The software loads the screen content and format from the database information which is specific to a customer's identification. This screen may be reconfigured as a customer's requirements change.

FIG. 14 represents a portfolio and reports menu web-based selection screen for the invention. Again, the selection of functions and the selection of reports, as well as the layout of these reports is customized for a particular customer's needs. The software loads the screen content and format from data in the database which is specific to the customer's identification. this screen may be reconfigured as a customer's requirements change.

FIG. 15 shows a representative test selection menu web-based selection screen for the invention. The menu is obtained from the database and is specific to the customer identification, group and control level numbers. As a customer's requirements change the screen is reconfigured.

FIG. 16 shows a scanning station log-in menu. This menu is used remains the same for self-service, customer site workstations and for production, plant site scanning and editing workstations (SEW). However, with the plant site SEW, the operator enters the data regarding the customer.

FIG. 17 shows a phase one bubble sheet spreadsheet for a batch of scanned test records. This spreadsheet contains phase one "highlight" prompts. (The dark area is a dark color prompt.) Dots are used in last name and middle initial fields to represent letters for actual names which appear on the actual spreadsheet.

FIG. 18 shows a phase two bubble sheet spreadsheet for a batch of scanned test records that have been transmitted to the plant site server, prior to further editing. This contains phase two "word" prompts.

Figures 19, 20:
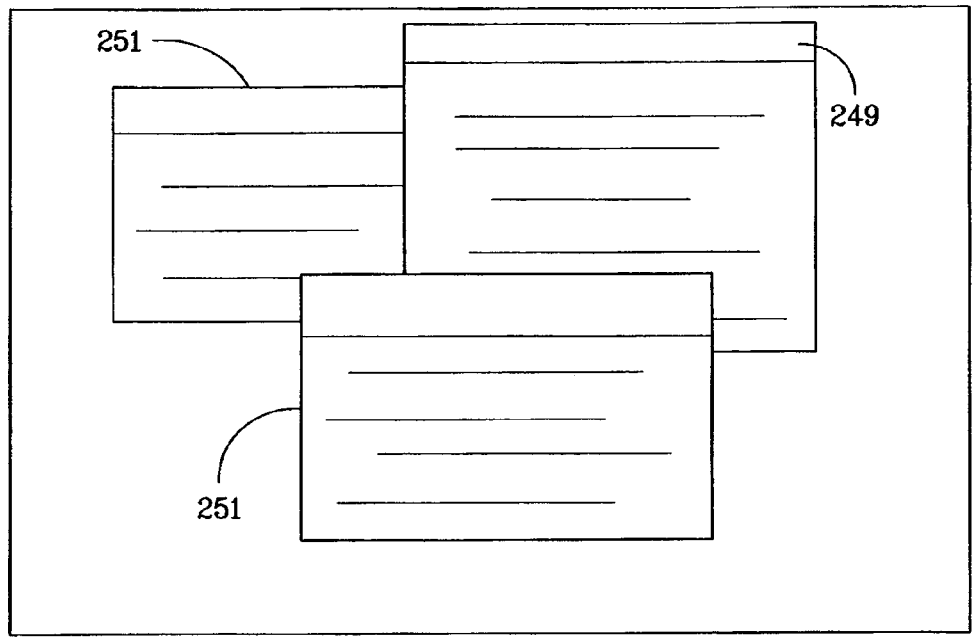
FIG. 19 shows a workstation monitor with delayed editing multiple spreadsheet windows.
FIG. 20 shows a workstation batch screen for a requested batch assessment.

FIG. 19 shows the multiple window screen at the workstation conducting delayed editing after scanning plural batches of bubble sheets. This screen would be generated during the process steps of the standard method for assembly line processing, FIGS. 11A-B. Here a batch report window 249 showing a summary of batches is presented and then opened into two individual batch windows 251 which show individual scanned records.

A first window presents test results on the largest category of populous which took the exam for the records scanned, such as a school district. In the window is a spreadsheet report. Each row represents the scanned test results of a different sub-group, such as an individual school in the school district. Each column is a "field" of information reported upon, such a number of student, or percentage passing, etc. The intersection of a row and column is a "cell".

If the scanned test record for a respective school contains detected errors, that row will be highlighted or show in a different background color. By clicking on that row, a second window will appear with a second spreadsheet. Each row in this second spreadsheet will represent the scanned test results of a further sub-group, such as an individual grade in a school.

Any row of this second spreadsheet which contains detected scanned test record errors, will be highlighted. By clicking on that row, a third window will appear with a third spreadsheet. Each row of this third spreadsheet represents the scanned test results of a further sub-group, such as a individual classroom in a grade.

Any row of this third spreadsheet which contains detected scanned test record errors will be highlighted. By clicking on that row, a fourth window will appear with a fourth spreadsheet. Each row of this fourth spreadsheet represents the scanned test results of individual examinees (students) in that classroom. The columns represent the fields of information, each row is an individual student.

For phase one errors every "cell" which has a detected error will be highlighted or appear in a different colored background. The status column for each row in which an error is highlighted, will either say "scanned" meaning no errors were found, or it will say "suspicious" or "invalid". When the error is edited, the phase one spreadsheet will be devoid of editing prompts.

For phase two errors every row (individual student scanned test record) which contains a detected error will have the whole row highlighted and a word prompt in the status column, such as "user not found" or "code not valid". Once the error in a row is edited out, the highlighting will disappear and the status will change to "accepted".

The spreadsheets going back to the original spreadsheet will change as the editing progresses backward to each "level" of grouping. Eventually, the first window's spreadsheet for the school district will have no error prompting (highlighting).

FIG. 20 shows a representative screen for a batch report (window spreadsheet 249 of FIG. 19) which would be used by an assembly line, plant site production operator/editor. This screen could also be used as a report screen when requested by an administrator.

Figure 21:
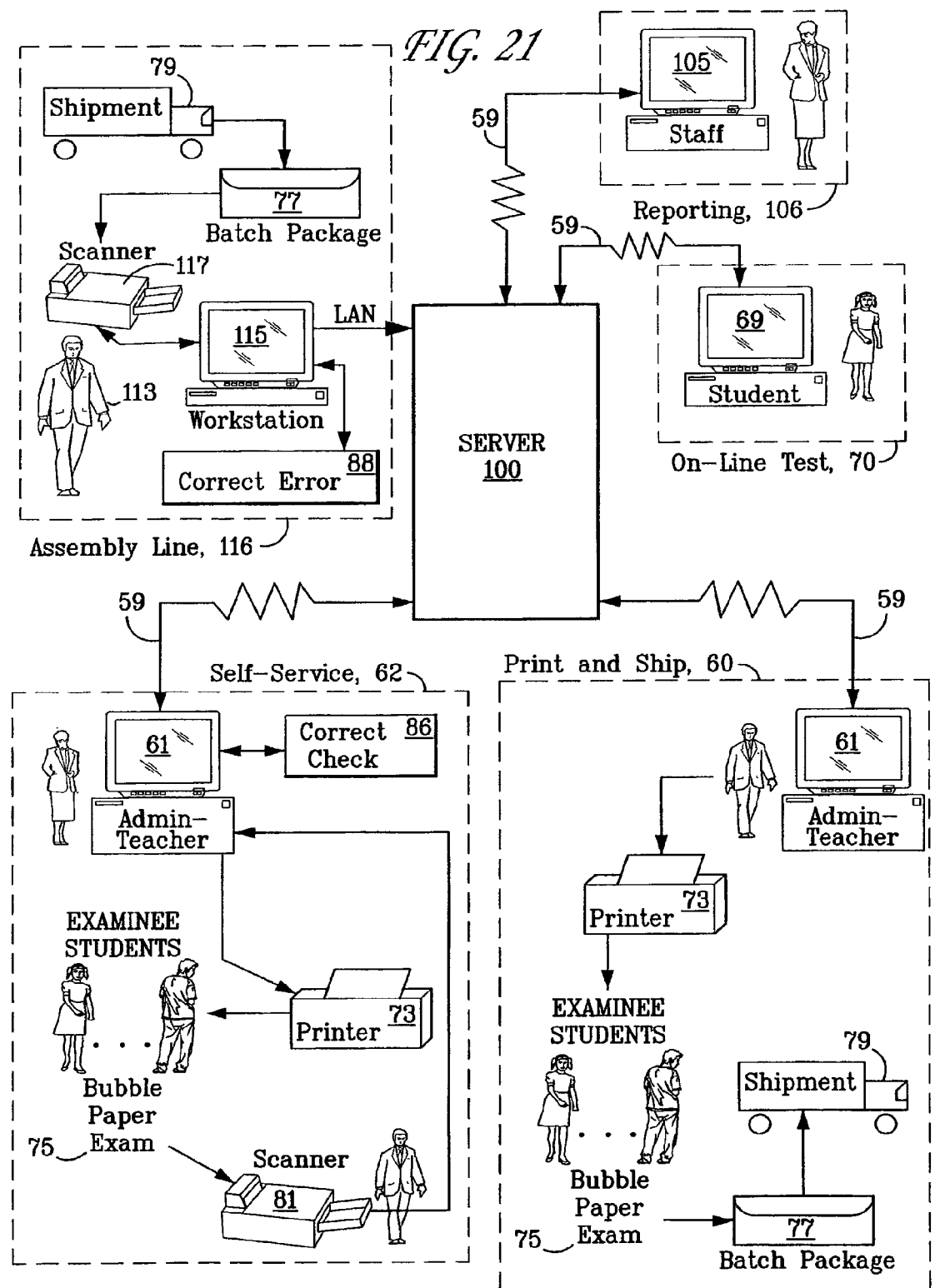
FIG. 21 shows the unified multi-modal web-based system with a single server unit.

A single server 100 with sufficient storage and computing capabilities, FIG. 21, can service a multi-modal distributed network comprising one or more of each of, on-line assessment (testing) sites 70, customer on-line and paper print and shipment sites 60, customer self-service sites 62, assembly line, plant stations 116 and customer administration staff workstations 106.

Each student assessment site 70, FIG. 21, has a workstation 69 with browser software connected to the internet 59 for logging-on with the server 100. Each customer print and ship site 60 includes an on-line workstation 61 with browser software for logging-on with the server 100. These customers 60 select a test, assign identification to it, and download the test in PDF format for printing 73 test booklets. The test answer sheets, i.e., bubble paper 75 are batched 77 and shipped 79 a plant site where there is assembly line scanning and editing 116.

Each customer self-service site 62, FIG. 21, has browser software for logging-on with the server 100. An auto-correction and phase one error checking and editing software package 86 can be resident at the self-service workstation 61. When this package 86 is resident, a downloaded test is printed 73 and administered, and the bubble sheets 75 are scanned 81 at the self-service site 62. The self-service scanner 81 is controlled by the error checking and editing software package 86 to separate phase one rejected bubble sheets into a reject tray and to prompt the operator for editing rejected scanned records. The operator is on-line with the server 100 for phase two error checking and prompting. The server 100 then receives valid and accepted records on-line.

With this arrangement 62, FIG. 21, a customer has the option to scan 81, auto-correct, and phase one error check and edit, off-line or while on-line. Regardless, once the self-service customer 62 is logged-in with the server 100, the scanned test records are available for phase two error checking and edit prompting by the server.

As an alternative, a part or all of the auto-correction and phase one error checking and prompting software 86 may remain resident on the server 100. In this case, the operator must remain on-line during the scanning process. The same spreadsheet will appear on the operator's workstation monitor with the same phase one prompts and the same phase two prompts, just as if the phase one error check and edit prompting software were resident at the self-service site 62.

Because of the relative slower transmission rates of the Internet, as opposed to direct, on-site, wire connection, it is more convenient for auto-correction software to reside on-site with the scanner 81. Auto-correction errors are easily resolved from information known or originating at a customer site, such as erroneous: date, group number, gender, test number, school number. This data is specific to a batch (i.e., a grouped quantity) of bubble being scanned.

As a further alternative the phase one error checking and edit prompting software may remain resident on the server 100, FIG. 21. Phase one error checking and edit prompting software can work satisfactorily from the server 100, as opposed to being resident at the self-service site 62. This is because checking for errors involving the: timing mark, test identification and examinee information and the manual editing of same by the operator is a slower process. However, it requires that the operator remains on-line during this phase of the process. Albeit, it an operator will save the spreadsheet error prompts and do editing on-line, he may then go on-line for the changes to be further checked. This would require repetitive updating and would delay the scoring and reporting process.

For each self-service site 62, phase two error correction and edit prompting is carried out at the plant-site by the server 100. Phase two errors are those base on pre-existing data, such as student code and user identification, which is resident at the plant-site in the server 100 database. Access to this database is available at the plant site only by a system, plant site server.

Each assembly line 116, plant site, workstation, FIG. 21, connected with the server 100, through an on site LAN network 119. Both phase one and phase two error checking and prompting software 88 reside at each assembly line 116 workstation 115. Scanned records which are free of detectable errors are immediately available to the server 100 and scored and store in its database.

A scored and stored scanned record may be immediately available to a staff member at a reporting site 106, FIG. 21, once this staff member is properly logged-on to the server 100.

Figure 22:
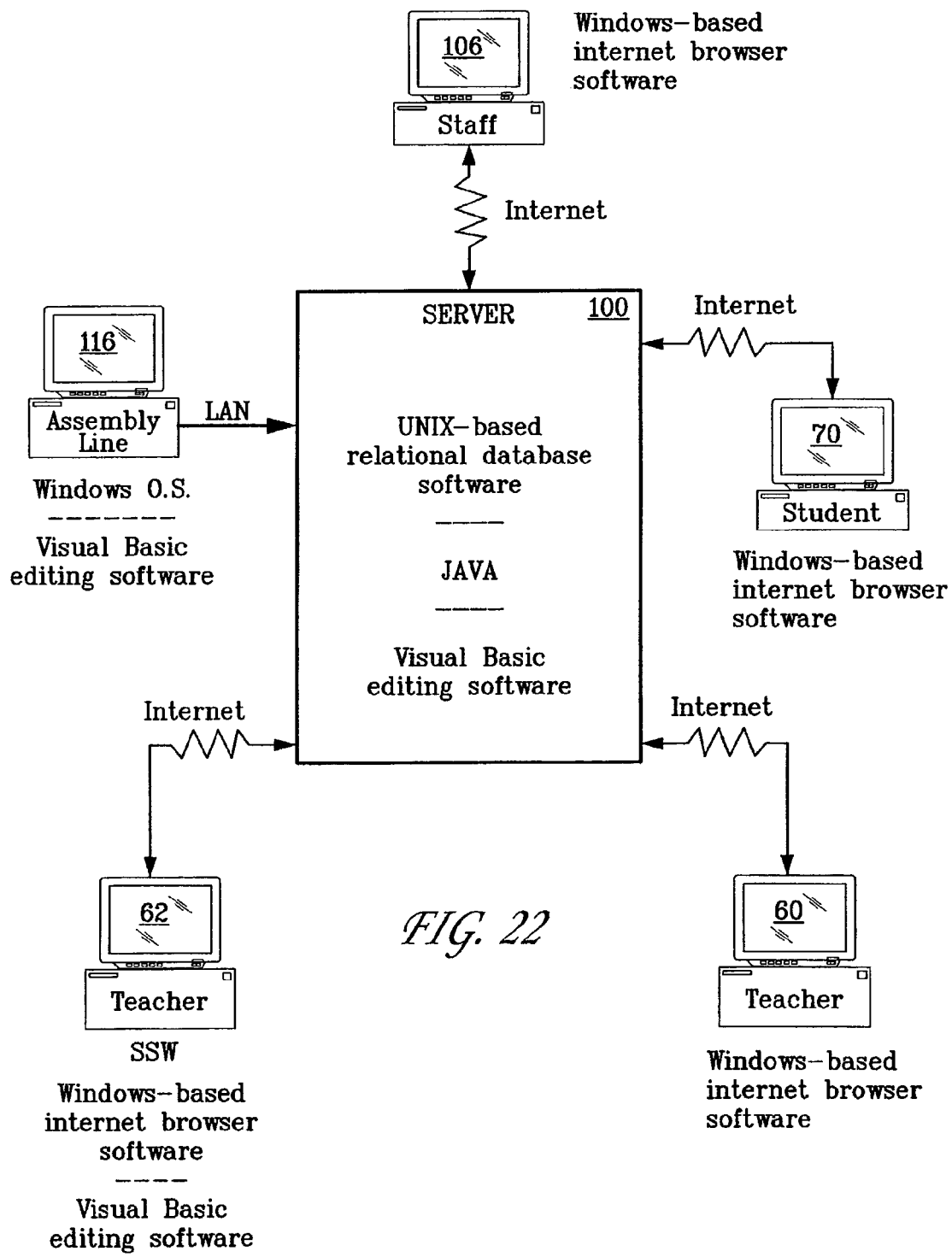
FIG. 22 shows the software distribution for the system.

FIG. 22 illustrates the typical distribution of software for the system. The plant site server 100 has a UNIX operating system and relational database software. Custom Java software provides the communications and screen presentations to each distributed workstation site 60, 70, 62, 106, and 116. Error checking and edit prompting software is also resident in the server as custom VISUAL BASIC software. The workstations (PC units) at each on-line (distributed) customer site 60, 62, 70, 106 are WINDOWS operating system based with commercial Internet browser software. Auto-correcting and phase one error checking and edit prompting software, in VISUAL BASIC resides on each self-service workstation 62. Similar WINDOWS operating system PC units implement each assembly line workstation 116 with auto-correction, phase one and phase two software resident therein in VISUAL BASIC.

Report screens are generally constructed specific to a customer's needs. The content and format for an assessment report screen is obtained from the database according to the administrator's identification and report request. The content and format of reports can also be reconfigured to meet a customer's change in requirements.

The software implementation of the invention provides prompts on the scanned test spreadsheet grids in the same manner regardless of the mode of operation. That is for both the plant site, assembly line, multi-batch processing, and the customer site individual batch processing, and the plant site individual batch processing.

Any dynamic information required to interpret the markings on a bubble sheet is stored on the system processing center (plant site) server, and not at the customer location. Thus each time the software is run, the customer can choose which type of bubble sheet it will scan, even if the sheet format was defined after the time the customer downloaded the necessary customer site invention software. The customer enters the form I.D. on the screen in FIG. 16, and the software automatically downloads to the customer any form definitions and validation rules from the server that are needed. With this structure, customer resident software need not be updated.

When running in the assembly line mode, the software stores scanned sheet data records according to the batch to which they belong. The list of batches is generated and presented to the customer or operator/editor after log-in. The batch information is presented in spreadsheet-like grid format with each row representing a batch. The software is capable of sorting the grid data by column header information. A row representing a batch for which a scanned record contains an error is highlighted in phase one, using a differing background color. This enables an editor to easily locate such an error containing batch. Statistics, FIG. 20, are automatically updated as the editor makes editing changes on the records within the batch being worked upon.

When a production line editor opens an individual batch screen for phase one errors, he gets the same screen, FIG. 17, that a self-service customer gets when performing customer site editing.

When a batch window appears, the records for all of the sheets scanned appear in the window organized in a color-coded format (invalid records are highlighted). The software permits editing changes to be made directly on the spreadsheet grid by clicking on a particular cell. Changes are automatically saved and will be seen by any other customer/operator/editor on any workstation connected to the network, the next time he views the same spreadsheet record.

When a scanned record has an error in a particular field (cell), the column, FIG. 17, which represents that filed is highlighted by the software using a bold font and/or a different background color. The entire row is highlighted as well.

The spreadsheet grid is sortable and can be sorted by any column (field).

The software has a synchronization mode, which takes scanned (valid) records and attempts to normalize the data from the scanned record and store it in the product database, The records are then given "word" prompted errors, i.e., "user not found", "server error", invalid test number", or with and "accepted" status. See FIG. 18. Incorporated into the software is a matching system for associating scanned records with pre-existing data using "first name", "last name", "date of birth", or other pertinent information. This matching system uses advanced fuzzy logic and does not require an exact match. This fuzzy logic enables the dynamic auto-correction function.

It is to be understood that the number of servers needed (shown in FIGS. 5 and 6) will depend upon the size of the customer base and number of items being processed simultaneously. The size of the database storage will depend upon the number of items stored (and the period of storage). Hardware selection is dependent upon current technology and future improvements in hardware. Any of the present servers in FIGS. 5 and 6 can be replaced by "banks" of ganged servers, if the requirement exceed a single existing unit.

Likewise for a very small system, a single server as shown in FIG. 20, may be sufficient.

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

What is claimed is:

1. A method for processing an answer sheet associated with an individual at a computing workstation, the method comprising:
   receiving the answer sheet, wherein the answer sheet comprises answer sheet fields;
   parsing the received answer sheet into a record, wherein the record comprises record fields corresponding to the answer sheet fields of the received answer sheet;
   determining whether at least one field in the record fields associated with the record includes a correctable human error; and
   performing, via a processor, an auto-correct function using customer site information when the at least one field includes the correctable human error, wherein the auto-correct function corrects the correctable human error in the at least one field.

2. The method of claim 1, wherein performing the auto-correct function corrects human errors such as an incorrect teacher name, date, group, control level, assignment code, gender code, test number, or school miss-identification.

3. The method of claim 1, further comprising performing a first error-checking function, wherein the first error-checking function determines whether at least one field in the record fields associated with the record contains invalid information.

4. The method of claim 3, wherein the invalid information comprises at least one of an incorrect name, examinee information, identification, timing mark, and answer format.

5. The method of claim 3, further comprising rendering a spreadsheet comprising an indication that the record is invalid if, based on the first error-checking function, at least one field contains invalid information.

6. The method of claim 5, further comprising providing an interface that allows an editor to view the spreadsheet, view the indication that the record is invalid, and correct the at least one field that contains invalid information.

7. The method of claim 3, further comprising performing a second error-checking function, wherein the second error-checking function determines whether at least one field in the record fields associated with the record contains a transmission error.

8. The method of claim 7, wherein the transmission error comprises at least one of an unknown user error or a code not found error.

9. The method of claim 7, further comprising rendering a spreadsheet comprising an indication that the record is invalid if, based on the first error-checking function and/or the second error-checking function, at least one field contains invalid information and/or the transmission error.

10. The method of claim 9, further comprising providing an interface that allows an editor to view the spreadsheet, view the indication that the record is invalid, and correct the at least one field that contains invalid information and/or the transmission error.

11. A system for reducing the time required to process an answer sheet associated with an individual, the system comprising:
    a processor for executing computer-executable instructions, the computer-executable instructions comprising instructions for:
        receiving the answer sheet, wherein the answer sheet comprises answer sheet fields;
        parsing the received answer sheet into a record, wherein the record comprises record fields corresponding to the answer sheet fields of the received answer sheet;
        determining whether at least one field in the record fields associated with the record contains a correctable human error; and
        performing an auto-correct function using customer site information when the at least one field includes the correctable human error, wherein the auto-correct function corrects the correctable human error in the at least one field.

12. The method of claim 11, wherein performing the auto-correct function corrects human errors such as an incorrect teacher name, date, group, control level, assignment code, gender code, test number, or school miss-identification.

13. The method of claim 11, further comprising performing a first error-checking function, wherein the first error-checking function determines whether at least one field in the record fields associated with the record contains invalid information.

14. The method of claim 13, wherein the invalid information comprises at least one of an incorrect name, examinee information, identification, timing mark, and answer format.

15. The method of claim 13, further comprising rendering a spreadsheet comprising an indication that the record is invalid if, based on the first error-checking function, at least one field contains invalid information.

16. The method of claim 15, further comprising providing an interface that allows an editor to view the spreadsheet, view the indication that the record is invalid, and correct the at least one field that contains invalid information.

17. The method of claim 13, further comprising performing a second error-checking function, wherein the second error-checking function determines whether at least one field in the record fields associated with the record contains a transmission error.

18. The method of claim 17, wherein the transmission error comprises at least one of an unknown user error or a code not found error.

19. The method of claim 17, further comprising rendering a spreadsheet comprising an indication that the record is invalid if, based on the first error-checking function and/or the second error-checking function, at least one field contains invalid information and/or the transmission error.

20. The method of claim 19, further comprising providing an interface that allows an editor to view the spreadsheet, view the indication that the record is invalid, and correct the at least one field that contains invalid information and/or the transmission error.

* * * * *